(12) United States Patent
Peinado

(10) Patent No.: US 7,073,063 B2
(45) Date of Patent: Jul. 4, 2006

(54) BINDING A DIGITAL LICENSE TO A PORTABLE DEVICE OR THE LIKE IN A DIGITAL RIGHTS MANAGEMENT (DRM) SYSTEM AND CHECKING OUT/CHECKING IN THE DIGITAL LICENSE TO/FROM THE PORTABLE DEVICE OR THE LIKE

(75) Inventor: Marcus Peinado, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 924 days.

(21) Appl. No.: 09/892,371

(22) Filed: Jun. 27, 2001

(65) Prior Publication Data

US 2002/0013772 A1    Jan. 31, 2002

Related U.S. Application Data

(60) Provisional application No. 60/126,614, filed on Mar. 27, 1999.

(51) Int. Cl.
*H04L 9/00* (2006.01)
(52) U.S. Cl. .................... 713/171; 380/278
(58) Field of Classification Search ........ 380/277–279; 705/71; 713/171
See application file for complete search history.

(56) References Cited

U.S. PATENT DOCUMENTS

| | | | |
|---|---|---|---|
| 3,718,906 A | 2/1973 | Lightner | 340/147 R |
| 4,323,921 A | 4/1982 | Guillou | 358/114 |
| 4,528,643 A | 7/1985 | Freeny, Jr. | 364/900 |
| 4,658,093 A | 4/1987 | Hellman | 380/25 |
| 4,683,553 A | 7/1987 | Mollier | 380/4 |
| 4,827,508 A | 5/1989 | Shear | 380/4 |
| 4,916,738 A | 4/1990 | Chandra et al. | 380/25 |
| 4,953,209 A | 8/1990 | Ryder, Sr. et al. | 380/23 |
| 4,977,594 A | 12/1990 | Shear | 380/4 |
| 5,050,213 A | 9/1991 | Shear | 380/25 |
| 5,103,392 A | 4/1992 | Mori | 395/725 |
| 5,103,476 A | 4/1992 | Waite et al. | 380/4 |
| 5,109,413 A | 4/1992 | Comerford et al. | 380/4 |
| 5,117,457 A | 5/1992 | Comerford et al. | 380/3 |

(Continued)

FOREIGN PATENT DOCUMENTS

EP    0 715 246 A1    6/1996

(Continued)

OTHER PUBLICATIONS

"Aladdin Knowledge Systems Partners with Rights Exchange, Inc. to Develop a Comprehensive Solution for Electronic Software Distribution," Aug. 3, 1988, 5 pages.

(Continued)

*Primary Examiner*—Emmanuel L. Moise
*Assistant Examiner*—Thomas Ho
(74) *Attorney, Agent, or Firm*—Woodcock Washburn LLP

(57) ABSTRACT

To render digital content encrypted according to a content key (KD) on a first device having a public key (PU1) and a corresponding private key (PR1), a digital license corresponding to the content is obtained, where the digital license includes the content key (KD) therein in an encrypted form. The encrypted content key (KD) from the digital license is decrypted to produce the content key (KD), and the public key (PU1) of the first device is obtained therefrom. The content key (KD) is then encrypted according to the public key (PU1) of the first device (PU1 (KD)), and a sub-license corresponding to and based on the obtained license is composed, where the sub-license includes (PU1 (KD)). The composed sub-license is then transferred to the first device.

22 Claims, 16 Drawing Sheets

U.S. PATENT DOCUMENTS

| | | | |
|---|---|---|---|
| 5,193,573 A | 3/1993 | Chronister | 137/315 |
| 5,222,134 A | 6/1993 | Waite et al. | 380/4 |
| 5,319,705 A | 6/1994 | Halter et al. | 380/4 |
| 5,410,598 A | 4/1995 | Shear | 380/4 |
| 5,509,070 A | 4/1996 | Schull | 380/4 |
| 5,629,980 A | 5/1997 | Stefik et al. | 380/4 |
| 5,634,012 A | 5/1997 | Stefik et al. | 395/239 |
| 5,638,443 A | 6/1997 | Stefik et al. | 380/4 |
| 5,666,416 A * | 9/1997 | Micali | 713/158 |
| 5,673,316 A | 9/1997 | Auerbach et al. | 380/4 |
| 5,710,887 A | 1/1998 | Chelliah et al. | 395/226 |
| 5,715,403 A | 2/1998 | Stefik | 395/244 |
| 5,717,757 A * | 2/1998 | Micali | 713/158 |
| 5,765,152 A | 6/1998 | Erickson | 707/9 |
| 5,793,868 A * | 8/1998 | Micali | 380/28 |
| 5,809,144 A | 9/1998 | Sirbu et al. | 380/25 |
| 5,845,281 A | 12/1998 | Benson et al. | 707/9 |
| 5,934,422 A | 8/1999 | Steed | 188/318 |
| 5,982,891 A | 11/1999 | Ginter et al. | 705/54 |
| 6,002,772 A * | 12/1999 | Saito | 705/58 |
| 6,006,332 A | 12/1999 | Rabne et al. | 713/201 |
| 6,112,181 A | 8/2000 | Shear et al. | 705/1 |

FOREIGN PATENT DOCUMENTS

| | | |
|---|---|---|
| EP | 0 715 247 A1 | 6/1996 |
| WO | WO 93/01550 | 1/1993 |
| WO | WO 96/13013 | 5/1996 |
| WO | WO 96/24092 | 8/1996 |
| WO | WO 96/27155 | 9/1996 |
| WO | WO 97/25798 | 7/1997 |
| WO | WO 97/43761 | 11/1997 |
| WO | WO 98/09209 | 3/1998 |
| WO | WO 98/10381 | 3/1998 |
| WO | WO 98/21679 | 5/1998 |
| WO | WO 98/24037 | 6/1998 |
| WO | WO 98/37481 | 8/1998 |

OTHER PUBLICATIONS

Amdur, D., "Metering Online Copyright," Jan. 16, 1996, 2 pages.

Amdur, D. (ed.), "InterTrust Challenges IBM Digital Content Metering," *Report On Electronic Commerce*, Jul. 23, 1996, 3(15), 1-2 and 16-18.

Armati, D., "Tools and standards for protection, control and presentation of data," Apr. 3, 1996, 17 pages.

Benjamin, R. et al., "Electronic markets and virtual value chains on the information superhighway," *Sloan Management Rev.*, Winter, 1995, 62-72.

Cassidy, "A Web developers guide to content encapsulation technology," Apr., 1997, 5 pages.

Clark, T., "Software Secures Digital Content on Web," *Interactive Week*, Sep. 25, 1995, 1 page.

Cox, B., "Superdistribution," *Idees Fortes*, Sep., 1994, 2 pages.

Cox, B., "What if There Is A Silver Bullet," *J. Object Oriented Programm.*, Jun. 1992, 8-9 and 76.

Griswold, G.N., "A Method for Protecting Copyright on Networks," *IMA Intell. Property Project Proceedings*, Jan. 1994, 1(1), 169-178.

Hauser, R.C., "Does licensing require new access control techniques?" Aug. 1993, 9 pages.

Hudgins-Bonafield, C. "Selling Knowledge on the Net," *Network Computing*, Jun. 1, 1995, 102-109.

"IBM spearheading intellectual property protection for information on the Internet," May, 1996, 3 pages.

"Technological Solutions Rise to Complement Law's Small Stick Guarding Electronic Works," *Information Law Alert*, Jun. 16, 1995, 3-4 and 7.

Kaplan, M.A., "IBM Cryptolopes_, Super-Distribution and Digital Rights Management," Dec., 1996, 7 pages.

Kent, S.T., "Protecting externally supplied software in small computers," Sep., 1980, 1-42 and 250-252.

Kohl, U. et al., "Safeguarding Digital Library Contents and Users; Protecting Documents Rather Than Channels," *D-Lib Magazine*, Sep., 1997, 9 pages.

Linn, R.J., "Copyright and Information Services in the Context of the National Research and Education Network," *IMA Intell. Property Project Proceedings*, Jan., 1994, 1(1), 1 and 10-20.

McNab, L., "Super-distribution works better in practical applications," Mar. 2, 1998, 2 pages.

Moeller, M., "NetTrust lets Cyberspace Merchants Take Account," *PC Week*, Nov. 20, 1995, 12(48), 1 page.

Moeller, M., "IBM takes charge of E-commerce; Plans client, server apps based on SET," Apr., 1996, 4 pages.

Pemberton, J., "An ONLINE Interview with Jeff Crigler at IBM InfoMarket," Jul., 1996, 6 pages.

"Licenslt: kinder, gentler copyright? Copyright management system links content, authorship information," *Seybold Report on Desktop Publishing*, 1996, 10(11), 2 pages.

Sibert, O. et al., "The DigiBox: A Self-protecting Container for Information Commerce," *First USENIX Workshop on Electronic Commerce*, Jul. 11-12, 1995, 171-183.

Sibert, O. et al., "Securing the Content, Not the Wire, for Information Commerce," Jul., 1995, 1-11.

Smith, M.G. et al., "A New Set of Rules For Information Commerce," *Electronic Commerce*, Nov. 6, 1995, 34-35.

Stefik, M., "Trusted Systems," Mar., 1997, 8 pages.

Stefik, M., "Shifting the Possible: How Trusted Systems and Digital Property Rights Challenge Us to Rethink Digital Publishing," *Technical Perspective*, 1997, 137-159.

Tarter, J. (ed.), "The Superdistribution Model," *Soft Trends*, Nov. 15, 1996, 3(6), 1-6.

"Rights Management in the Digital Age: Trading in Bits, Not Atoms," Spring, 1997, 4, 3 pages.

Weber, R., "Digital Right Management Technology," Oct., 1995, 35 pages.

White, S.R. et al., "ABYSS: An Architecture for Software Protection," *IEEE Trans. On Software Engineering*, Jun., 1990, 16(6), 619-629.

White, S.R. et al., "ABYSS: A trusted architecture for software protection," *IEEE Symposium on Security and Privacy*, Apr. 27-29, 1987, 38-51.

"Boxing Up Bytes," 2 pages.

Ramanujapuram, A. et al., "Digital Content & Intellectual Property Rights: A specification language and tools for rights management," Dec., 1998, 20-23 and 26.

Bird, R., et al., "The kryptoKnight family of light-weight protocols for authentication and key distribution," *IEEE*, 1995, 31-41.

Boyl, J.P., et al., "The ESPRIT Project CAFÉ High security digital payment systems," ESORICs, LNCS 875, 1994, 217-230.

Ishii, S., et al., "2,048-bit public-key encryption processor," *NTT Human Interface Labs.*, 1998, 259-267 (Abstract on p. 261).

Veron, P., "Improved identification schemes based on error-correcting codes," *AAECC*, 1997, 57-69.

U.S. Appl. No. 09/645,887, filed Aug. 25, 2000, Leung et al.

* cited by examiner

| License 16 |
|---|
| Content ID |
| DRL 48 or KD (DRL 48) |
| PU-BB (KD) |
| S (PR-LS) |
| CERT (PU-LS) S (PR-CS) |

Fig. 8

| Digital Content Package 12p |
|---|
| KD (Digital Content 12) |
| Content ID |
| Key ID |
| License Acquisition Info |
| KD (PU-CS) S (PR-CS) |

Fig. 3

BINDING A DIGITAL LICENSE TO A PORTABLE DEVICE OR THE LIKE IN A DIGITAL RIGHTS MANAGEMENT (DRM) SYSTEM AND CHECKING OUT/CHECKING IN THE DIGITAL LICENSE TO/FROM THE PORTABLE DEVICE OR THE LIKE

CROSS-REFERENCE TO RELATED APPLICATION

This application is related to U.S. patent application Ser. No. 09/645,887, filed Aug. 25, 2000 and entitled "BINDING DIGITAL CONTENT TO A PORTABLE STORAGE DEVICE OR THE LIKE IN A DIGITAL RIGHTS MANAGEMENT (DRM) SYSTEM", U.S. patent application Ser. No. 09/290,363, filed Apr. 12, 1999 and entitled "ENFORCEMENT ARCHITECTURE AND METHOD FOR DIGITAL RIGHTS MANAGEMENT", and U.S. Provisional Application No. 60/126,614, filed Mar. 27, 1999 and entitled "ENFORCEMENT ARCHITECTURE AND METHOD FOR DIGITAL RIGHTS MANAGEMENT", all of which are hereby incorporated by reference.

TECHNICAL FIELD

The present invention relates to an architecture for enforcing rights in digital content. More specifically, the present invention relates to such an enforcement architecture that allows access to encrypted digital content only in accordance with parameters specified by license rights acquired by a user of the digital content.

BACKGROUND OF THE INVENTION

Digital rights management and enforcement is highly desirable in connection with digital content such as digital audio, digital video, digital text, digital data, digital multimedia, etc., where such digital content is to be distributed to users. Typical modes of distribution include tangible devices such as a magnetic (floppy) disk, a magnetic tape, an optical (compact) disk (CD), etc., and intangible media such as an electronic bulletin board, an electronic network, the Internet, etc. Upon being received by the user, such user renders or 'plays' the digital content with the aid of an appropriate rendering device such as a media player on a personal computer or the like.

Typically, a content owner or rights-owner, such as an author, a publisher, a broadcaster, etc. (hereinafter "content owner"), wishes to distribute such digital content to a user or recipient in exchange for a license fee or some other consideration. Such content owner, given the choice, would likely wish to restrict what the user can do with such distributed digital content. For example, the content owner would like to restrict the user from copying and re-distributing such content to a second user, at least in a manner that denies the content owner a license fee from such second user.

In addition, the content owner may wish to provide the user with the flexibility to purchase different types of use licenses at different license fees, while at the same time holding the user to the terms of whatever type of license is in fact purchased. For example, the content owner may wish to allow distributed digital content to be played only a limited number of times, only for a certain total time, only on a certain type of machine, only on a certain type of media player, only by a certain type of user, etc.

However, after distribution has occurred, such content owner has very little if any control over the digital content. This is especially problematic in view of the fact that practically every new or recent personal computer includes the software and hardware necessary to make an exact digital copy of such digital content, and to download such exact digital copy to a write-able magnetic or optical disk, or to send such exact digital copy over a network such as the Internet to any destination.

Of course, as part of the legitimate transaction where the license fee was obtained, the content owner may require the user of the digital content to promise not to re-distribute such digital content. However, such a promise is easily made and easily broken. A content owner may attempt to prevent such re-distribution through any of several known security devices, usually involving encryption and decryption. However, there is likely very little that prevents a mildly determined user from decrypting encrypted digital content, saving such digital content in an un-encrypted form, and then re-distributing same.

A need exists, then, for providing an enforcement architecture and method that allows the controlled rendering or playing of arbitrary forms of digital content, where such control is flexible and definable by the content owner of such digital content. A need also exists for providing a controlled rendering environment on a computing device such as a personal computer, where the rendering environment includes at least a portion of such enforcement architecture. Such controlled rendering environment allows that the digital content will only be rendered as specified by the content owner, even though the digital content is to be rendered on a computing device which is not under the control of the content owner.

Further, a need exists for a trusted component running on the computing device, where the trusted component enforces the rights of the content owner on such computing device in connection with a piece of digital content, even against attempts by the user of such computing device to access such digital content in ways not permitted by the content owner. As but one example, such a trusted software component prevents a user of the computing device from making a copy of such digital content, except as otherwise allowed for by the content owner thereof.

SUMMARY OF THE INVENTION

In the present invention, a method is provided for rendering encrypted digital content on a first device having a public key (PU1) and a corresponding private key (PR1), where the digital content being encrypted according to a content key (KD). In the method, a digital license corresponding to the content is obtained, where the digital license including the content key (KD) therein in an encrypted form. The encrypted content key (KD) from the digital license is decrypted to produce the content key (KD), and the public key (PU1) of the first device is obtained therefrom. The content key (KD) is then encrypted according to the public key (PU1) of the first device (PU1 (KD)), and a sub-license corresponding to and based on the obtained license is composed, where the sub-license includes (PU1 (KD)). The composed sub-license is then transferred to the first device, wherein the first device can decrypt (PU1 (KD)) with the private key thereof (PR1) to produce the content key (KD), and can render the encrypted content on the first device with the produced content key (KD).

To check out a sub-license from a second device to a first device, the second device requests a nonce from the first device, and receives such nonce. The second device then sends the checked-out sub-license and the received nonce to the first device. The first device then concludes that the nonce sent by the second device is the same nonce received by the second device, and therefore that the sent sub-license that accompanies the sent nonce is legitimate, and stores the sent sub-license. To check in the checked-out sub-license, the first device deletes the checked-out sub-license and then provides a trusted indication to the second device that the checked-out sub-license has in fact been deleted.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings:

FIG. 3 is a block diagram of a digital content package having digital content for use in connection with the architecture of FIG. 1 in accordance with one embodiment of the present invention;

FIG. 8 is a block diagram of a digital license for use in connection with the architecture of FIG. 1 in accordance with one embodiment of the present invention;

DETAILED DESCRIPTION OF THE INVENTION

Figure 1:
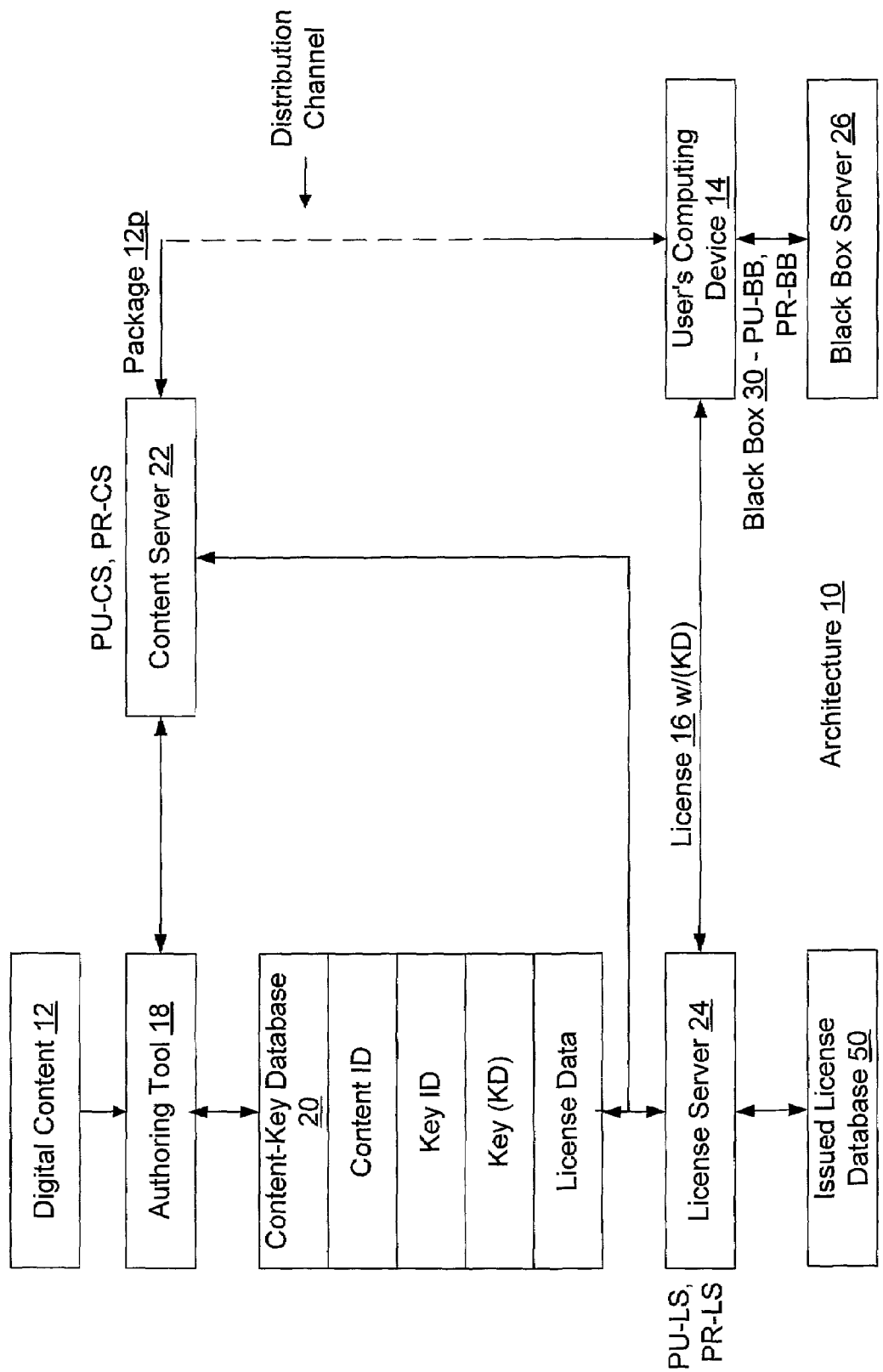
FIG. 1 is a block diagram showing an enforcement architecture in accordance with one embodiment of the present invention.

Referring to the drawings in details, wherein like numerals are used to indicate like elements throughout, there is shown in FIG. 1 an enforcement architecture 10 in accordance with one embodiment of the present invention. Overall, the enforcement architecture 10 allows an owner of digital content 12 to specify license rules that must be satisfied before such digital content 12 is allowed to be rendered on a user's computing device 14. Such license rules are embodied within a digital license 16 that the user/user's computing device 14 (hereinafter, such terms are interchangeable unless circumstances require otherwise) must obtain from the content owner or an agent thereof. The digital content 12 is distributed in an encrypted form, and may be distributed freely and widely. Preferably, the decrypting key (KD) for decrypting the digital content 12 is included with the license 16.

Computer Environment

Figure 12:
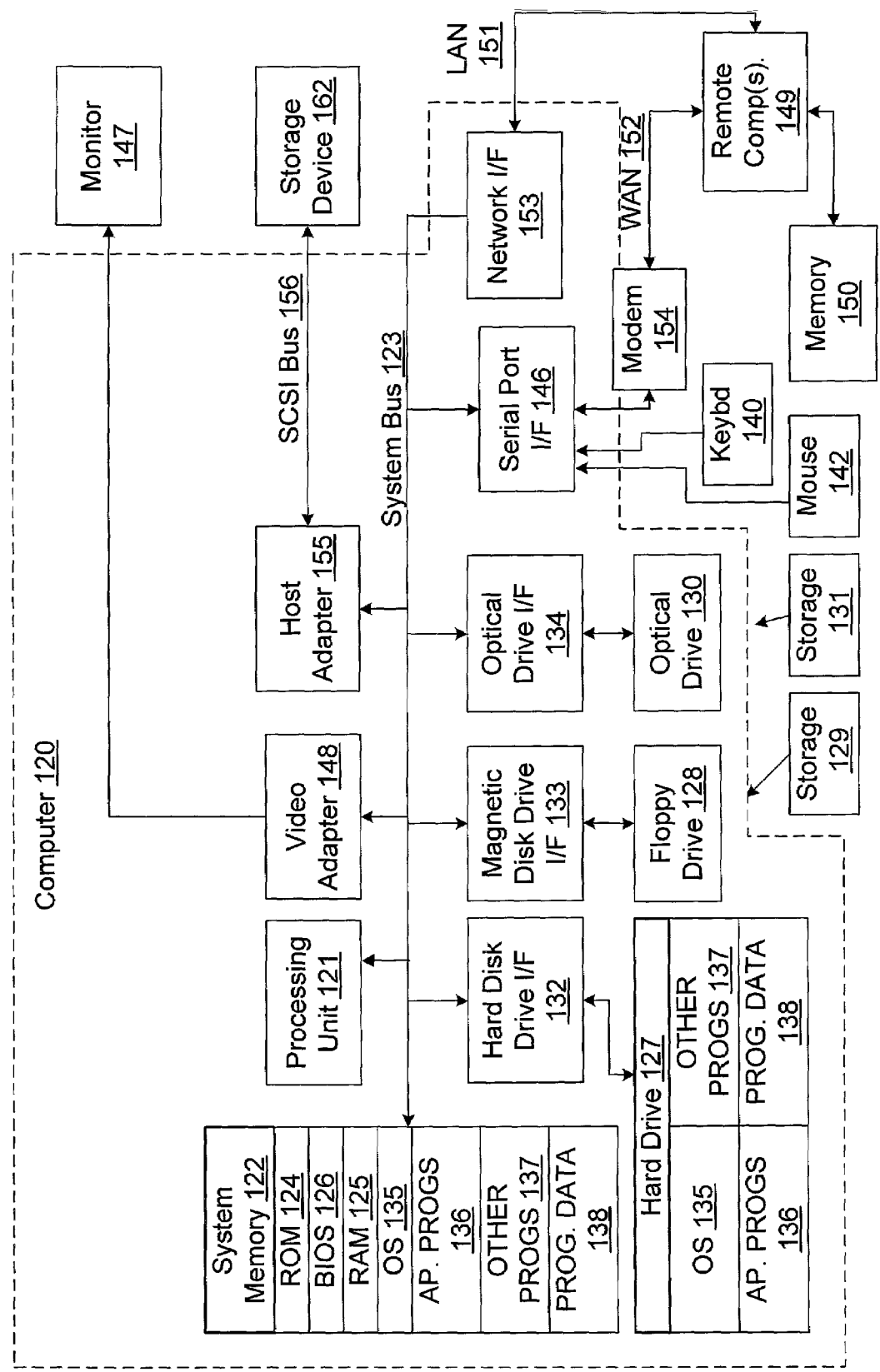
FIG. 12 is a block diagram representing a general purpose computer system in which aspects of the present invention and/or portions thereof may be incorporated.

FIG. 12 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, mini-computers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 12, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 12 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 12. The logical connections depicted in FIG. 12 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Architecture

Referring again to FIG. 1, in one embodiment of the present invention, the architecture 10 includes an authoring tool 18, a content-key database 20, a content server 22, a license server 24, and a black box server 26, as well as the aforementioned user's computing device 14.

Architecture—Authoring Tool 18

The authoring tool 18 is employed by a content owner to package a piece of digital content 12 into a form that is amenable for use in connection with the architecture 10 of the present invention. In particular, the content owner provides the authoring tool 18 with the digital content 12, instructions and/or rules that are to accompany the digital content 12, and instructions and/or rules as to how the digital content 12 is to be packaged. The authoring tool 18 then produces a digital content package 12*p* having the digital content 12 encrypted according to an encryption/decryption key, and the instructions and/or rules that accompany the digital content 12.

In one embodiment of the present invention, the authoring tool 18 is instructed to serially produce several different digital content 12 packages 12*p*, each having the same digital content 12 encrypted according to a different encryption/decryption key. As should be understood, having several different packages 12*p* with the same digital content 12 may be useful for tracking the distribution of such packages 12*p*/content 12 (hereinafter simply "digital content 12", unless circumstances require otherwise). Such distribution tracking is not ordinarily necessary, but may be used by an investigative authority in cases where the digital content 12 has been illegally sold or broadcast.

In one embodiment of the present invention, the encryption/decryption key that encrypts the digital content 12 is a symmetric key, in that the encryption key is also the decryption key (KD). As will be discussed below in more detail, such decryption key (KD) is delivered to a user's computing device 14 in a hidden form as part of a license 16 for such digital content 12. Preferably, each piece of digital content 12 is provided with a content ID (or each package 12*p* is provided with a package ID), each decryption key (KD) has a key ID, and the authoring tool 18 causes the decryption key (KD), key ID, and content ID (or package ID) for each piece of digital content 12 (or each package 12*p*) to be stored in the content-key database 20. In addition, license data regarding the types of licenses 16 to be issued for the digital content 12 and the terms and conditions for each type of license 16 may be stored in the content-key database 20, or else in another database (not shown). Preferably, the license data can be modified by the content owner at a later time as circumstances and market conditions may require.

In use, the authoring tool 18 is supplied with information including, among other things:
- the digital content 12 to be packaged;
- the type and parameters of watermarking and/or fingerprinting to be employed, if any;
- the type and parameters of data compression to be employed, if any;
- the type and parameters of encryption to be employed;
- the type and parameters of serialization to be employed, if any; and
- the instructions and/or rules that are to accompany the digital content 12.

As is known, a watermark is a hidden, computer-readable signal that is added to the digital content 12 as an identifier. A fingerprint is a watermark that is different for each instance. As should be understood, an instance is a version of the digital content 12 that is unique. Multiple copies of any instance may be made, and any copy is of a particular instance. When a specific instance of digital content 12 is illegally sold or broadcast, an investigative authority can perhaps identify suspects according to the watermark I fingerprint added to such digital content 12.

Data compression may be performed according to any appropriate compression algorithm without departing from the spirit and scope of the present invention. For example, the .mp3 or .wav compression algorithm may be employed. Of course, the digital content 12 may already be in a compressed state, in which case no additional compression is necessary.

The instructions and/or rules that are to accompany the digital content 12 may include practically any appropriate instructions, rules, or other information without departing from the spirit and scope of the present invention. As will be discussed below, such accompanying instructions/rules/information are primarily employed by the user and the user's computing device 14 to obtain a license 16 to render the digital content 12. Accordingly, such accompanying instructions/rules/information may include an appropriately formatted license acquisition script or the like, as will be described in more detail below. In addition, or in the alternative, such accompanying instructions/rules/information may include 'preview' information designed to provide a user with a preview of the digital content 12.

With the supplied information, the authoring tool 18 then produces one or more packages 12p corresponding to the digital content 12. Each package 12p may then be stored on the content server 22 for distribution to the world.

Figure 2:
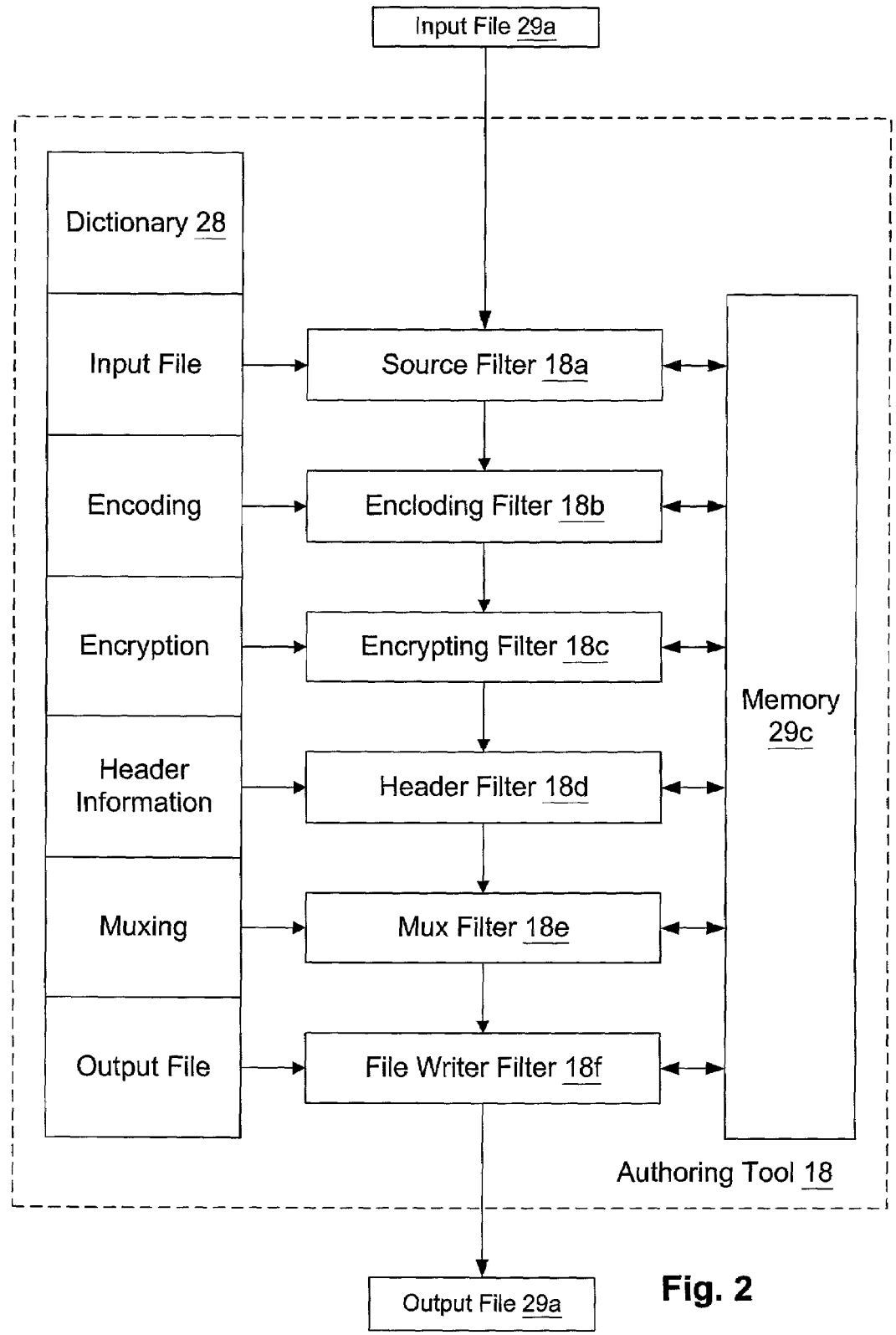
FIG. 2 is a block diagram of the authoring tool of the architecture of FIG. 1 in accordance with one embodiment of the present invention.

In one embodiment of the present invention, and referring now to FIG. 2, the authoring tool 18 is a dynamic authoring tool 18 that receives input parameters which can be specified and operated on. Accordingly, such authoring tool 18 can rapidly produce multiple variations of package 12p for multiple pieces of digital content 12. Preferably, the input parameters are embodied in the form of a dictionary 28, as shown, where the dictionary 28 includes such parameters as:
- the name of the input file 29a having the digital content 12;
- the type of encoding that is to take place
- the encryption/decryption key (KD) to be employed,
- the accompanying instructions/rules/information ('header information') to be packaged with the digital content 12 in the package 12p.
- the type of muxing that is to occur; and
- the name of the output file 29b to which the package 12p based on the digital content 12 is to be written.

As should be understood, such dictionary 28 is easily and quickly modifiable by an operator of the authoring tool 18 (human or machine), and therefore the type of authoring performed by the authoring tool 18 is likewise easily and quickly modifiable in a dynamic manner. In one embodiment of the present invention, the authoring tool 18 includes an operator interface (not shown) displayable on a computer screen to a human operator. Accordingly, such operator may modify the dictionary 28 by way of the interface, and further may be appropriately aided and/or restricted in modifying the dictionary 28 by way of the interface.

In the authoring tool 18, and as seen in FIG. 2, a source filter 18a receives the name of the input file 29a having the digital content 12 from the dictionary 28, and retrieves such digital content 12 from such input file and places the digital content 12 into a memory 29c such as a RAM or the like. An encoding filter 18b then performs encoding on the digital content 12 in the memory 29c to transfer the file from the input format to the output format according to the type of encoding specified in the dictionary 28 (i.e., .wav to asp, .mp3 to asp, etc.), and places the encoded digital content 12 in the memory 29c. As shown, the digital content 12 to be packaged (music, e.g.) is received in a compressed format such as the .wav or .mp3 format, and is transformed into a format such as the asp (active streaming protocol) format. Of course, other input and output formats may be employed without departing from the spirit and scope of the present invention.

Thereafter, an encryption filter 18c encrypts the encoded digital content 12 in the memory 29c according to the encryption/decryption key (KD) specified in the dictionary 28, and places the encrypted digital content 12 in the memory 29c. A header filter 18d then adds the header information specified in the dictionary 28 to the encrypted digital content 12 in the memory 29c.

As should be understood, depending on the situation, the package 12p may include multiple streams of temporally aligned digital content 12 (one stream being shown in FIG. 2), where such multiple streams are multiplexed (i.e., 'muxed'). Accordingly, a mux filter 18e performs muxing on the header information and encrypted digital content 12 in the memory 29c according to the type of muxing specified in the dictionary 28, and places the result in the memory 29c. A file writer filter 18f then retrieves the result from the memory 29c and writes such result to the output file 29b specified in the dictionary 28 as the package 12p.

It should be noted that in certain circumstances, the type of encoding to be performed will not normally change. Since the type of muxing typically is based on the type of encoding, it is likewise the case that the type of muxing will not normally change, either. If this is in fact the case, the dictionary 28 need not include parameters on the type of encoding and/or the type of muxing. Instead, it is only necessary that the type of encoding be 'hardwired' into the encoding filter and/or that the type of muxing be 'hardwired' into the mux filter. Of course, as circumstance require, the authoring tool 18 may not include all of the aforementioned filters, or may include other filters, and any included filter may be hardwired or may perform its function according to parameters specified in the dictionary 28, all without departing from the spirit and scope of the present invention.

Preferably, the authoring tool 18 is implemented on an appropriate computer, processor, or other computing machine by way of appropriate software. The structure and operation of such machine and such software should be apparent based on the disclosure herein and therefore do not require any detailed discussion in the present disclosure.

Architecture—Content Server 22

Referring again to FIG. 1, in one embodiment of the present invention, the content server 22 distributes or otherwise makes available for retrieval the packages 12p produced by the authoring tool 18. Such packages 12p may be distributed as requested by the content server 22 by way of any appropriate distribution channel without departing from the spirit and scope of the present invention. For example, such distribution channel may be the Internet or another network, an electronic bulletin board, electronic mail, or the like. In addition, the content server 22 may be employed to copy the packages 12p onto magnetic or optical disks or other storage devices, and such storage devices may then be distributed.

It will be appreciated that the content server 22 distributes packages 12p without regard to any trust or security issues. As discussed below, such issues are dealt with in connection with the license server 24 and the relationship between such license server 24 and the user's computing device 14. In one embodiment of the present invention, the content server 22 freely releases and distributes packages 12p having digital content 12 to any distributee requesting same. However, the content server 22 may also release and distribute such packages 12p in a restricted manner without departing from the spirit and scope of the present invention. For example, the content server 22 may first require payment of a pre-determined distribution fee prior to distribution, or may require that a distributes identify itself, or may indeed make a determination of whether distribution is to occur based on an identification of the distributee.

In addition, the content server 22 may be employed to perform inventory management by controlling the authoring tool 18 to generate a number of different packages 12p in advance to meet an anticipated demand. For example, the server could generate 100 packages 12p based on the same digital content 12, and serve each package 12p 10 times. As supplies of packages 12p dwindle to 20, for example, the content server 22 may then direct the authoring tool 18 to generate 80 additional packages 12p, again for example.

Preferably, the content server 22 in the architecture 10 has a unique public/private key pair (PU-CS, PR-CS) that is employed as part of the process of evaluating a license 16 and obtaining a decryption key (KD) for decrypting corresponding digital content 12, as will be explained in more detail below. As is known, a public/private key pair is an asymmetric key, in that what is encrypted in one of the keys in the key pair can only be decrypted by the other of the keys in the key pair. In a public/private key pair encryption system, the public key may be made known to the world, but the private key should always be held in confidence by the owner of such private key. Accordingly, if the content server 22 encrypts data with its private key (PR-CS), it can send the encrypted data out into the world with its public key (PU-CS) for decryption purposes. Correspondingly, if an external device wants to send data to the content server 22 so that only such content server 22 can decrypt such data, such external device must first obtain the public key of the content server 22 (PU-CS) and then must encrypt the data with such public key. Accordingly, the content server 22 (and only the content server 22) can then employ its private key (PR-CS) to decrypt such encrypted data.

As with the authoring tool 18, the content server 22 is implemented on an appropriate computer, processor, or other computing machine by way of appropriate software. The structure and operation of such machine and such software should be apparent based on the disclosure herein and therefore do not require any detailed discussion in the present disclosure. Moreover, in one embodiment of the present invention, the authoring tool 18 and the content server 22 may reside on a single computer, processor, or other computing machine, each in a separate work space. It should be recognized, moreover, that the content server 22 may in certain circumstances include the authoring tool 18 and/or perform the functions of the authoring tool 18, as discussed above.

Structure of Digital Content Package 12p

Referring now to FIG. 3, in one embodiment of the present invention, the digital content package 12p as distributed by the content server 22 includes:

the digital content 12 encrypted with the encryption/decryption key (KD), as was discussed above (i.e., (KD(CONTENT)));

the content ID (or package ID) of such digital content 12 (or package 12p);

the key ID of the decryption key (KD);

license acquisition information, preferably in an un-encrypted form; and the key KD encrypting the content server 22 public key (PU-CS), signed by the content server 22 private key (PR-CS) (i.e., (KD (PU-CS) S (PR-CS).

With regard to (KD (PU-CS) S (PR-CS)), it is to be understood that such item is to be used in connection with validating the digital content 12 and/or package 12p, as will be explained below. Unlike a certificate with a digital signature (see below), the key (PU-CS) is not necessary to get at (KD (PU-CS)). Instead, the key (PU-CS) is obtained merely by applying the decryption key (KD). Once so obtained, such key (PU-CS) may be employed to test the validity of the signature (S (PR-CS)).

It should also be understood that for such package 12p to be constructed by the authoring tool 18, such authoring tool 18 must already possess the license acquisition information and (KD (PU-CS) S (PR-CS)), presumably as header information supplied by the dictionary 28. Moreover, the authoring tool 18 and the content server 22 must presumably interact to construct (KD (PU-CS) S (PR-CS)). Such interaction may for example include the steps of:

the content server 22 sending (PU-CS) to the authoring tool 18;

the authoring tool 18 encrypting (PU-CS) with (KD) to produce (KD (PU-CS));

the authoring tool 18 sending (KD (PU-CS)) to the content server 22;

the content server 22 signing (KD (PU-CS)) with (PR-CS) to produce (KD (PU-CS) S (PR-CS)); and the content server 22 sending (KD (PU-CS) S (PR-CS)) to the authoring tool 18.

Architecture—License Server 24

Referring again to FIG. 1, in one embodiment of the present invention, the license server 24 performs the functions of receiving a request for a license 16 from a user's computing device 14 in connection with a piece of digital content 12, determining whether the user's computing device 14 can be trusted to honor an issued license 16, negotiating such a license 16, constructing such license 16, and transmitting such license 16 to the user's computing device 14. Preferably, such transmitted license 16 includes the decryption key (KD) for decrypting the digital content 12. Such license server 24 and such functions will be explained in more detail below. Preferably, and like the content server 22, the license server 24 in the architecture 10 has a unique public/private key pair (PU-LS, PR-LS) that is employed as part of the process of evaluating a license 16 and obtaining a decryption key (KD) for decrypting corresponding digital content 12, as will be explained in more detail below.

As with the authoring tool 18 and the content server 22, the license server 24 is implemented on an appropriate computer, processor, or other computing machine by way of appropriate software. The structure and operation of such machine and such software should be apparent based on the disclosure herein and therefore do not require any detailed discussion in the present disclosure. Moreover, in one embodiment of the present invention the authoring tool 18 and/or the content server 22 may reside on a single computer, processor, or other computing machine together with the license server 24, each in a separate work space.

In one embodiment of the present invention, prior to issuance of a license 16, the license server 24 and the content server 22 enter into an agency agreement or the like, wherein the license server 24 in effect agrees to be the licensing authority for at least a portion of the digital content 12 distributed by the content server 22. As should be understood, one content server 22 may enter into an agency agreement or the like with several license servers 24, and/or one license server 24 may enter into an agency agreement or the like with several content servers 22, all without departing from the spirit and scope of the present invention.

Preferably, the license server 24 can show to the world that it does in fact have the authority to issue a license 16 for digital content 12 distributed by the content server 22. To do so, it is preferable that the license server 24 send to the content server 22 the license server 24 public key (PU-LS), and that the content server 22 then send to the license server 24 a digital certificate containing PU-LS as the contents signed by the content server 22 private key (CERT (PU-LS) S (PR-CS)). As should be understood, the contents (PU-LS) in such certificate can only be accessed with the content server 22 public key (PU-CS). As should also be understood, in general, a digital signature of underlying data is an encrypted form of such data, and will not match such data when decrypted if such data has been adulterated or otherwise modified.

As a licensing authority in connection with a piece of digital content 12, and as part of the licensing function, the license server 24 must have access to the decryption key (KD) for such digital content 12. Accordingly, it is preferable that license server 24 have access to the content-key database 20 that has the decryption key (KD), key ID, and content ID (or package ID) for such digital content 12 (or package 12p).

Architecture—Black Box Server 26

Still referring to FIG. 1, in one embodiment of the present invention, the black box server 26 performs the functions of installing and/or upgrading a new black box 30 in a user's computing device 14. As will be explained in more detail below, the black box 30 performs encryption and decryption functions for the user's computing device 14. As will also be explained in more detail below, the black box 30 is intended to be secure and protected from attack. Such security and protection is provided, at least in part, by upgrading the black box 30 to a new version as necessary by way of the black box server 26, as will be explained in more detail below.

As with the authoring tool 18, the content server 22, and the license server 24, the black box server 26 is implemented on an appropriate computer, processor, or other computing machine by way of appropriate software. The structure and operation of such machine and such software should be apparent based on the disclosure herein and therefore do not require any detailed discussion in the present disclosure. Moreover, in one embodiment of the present invention the license server 24, the authoring tool 18, and/or the content server 22 may reside on a single computer, processor, or other computing machine together with the black box server 26, each in a separate work space. Note, though, that for security purposes, it may be wise to have the black box server 26 on a separate machine.

Architecture—User's Computing Device 14

Figure 4:
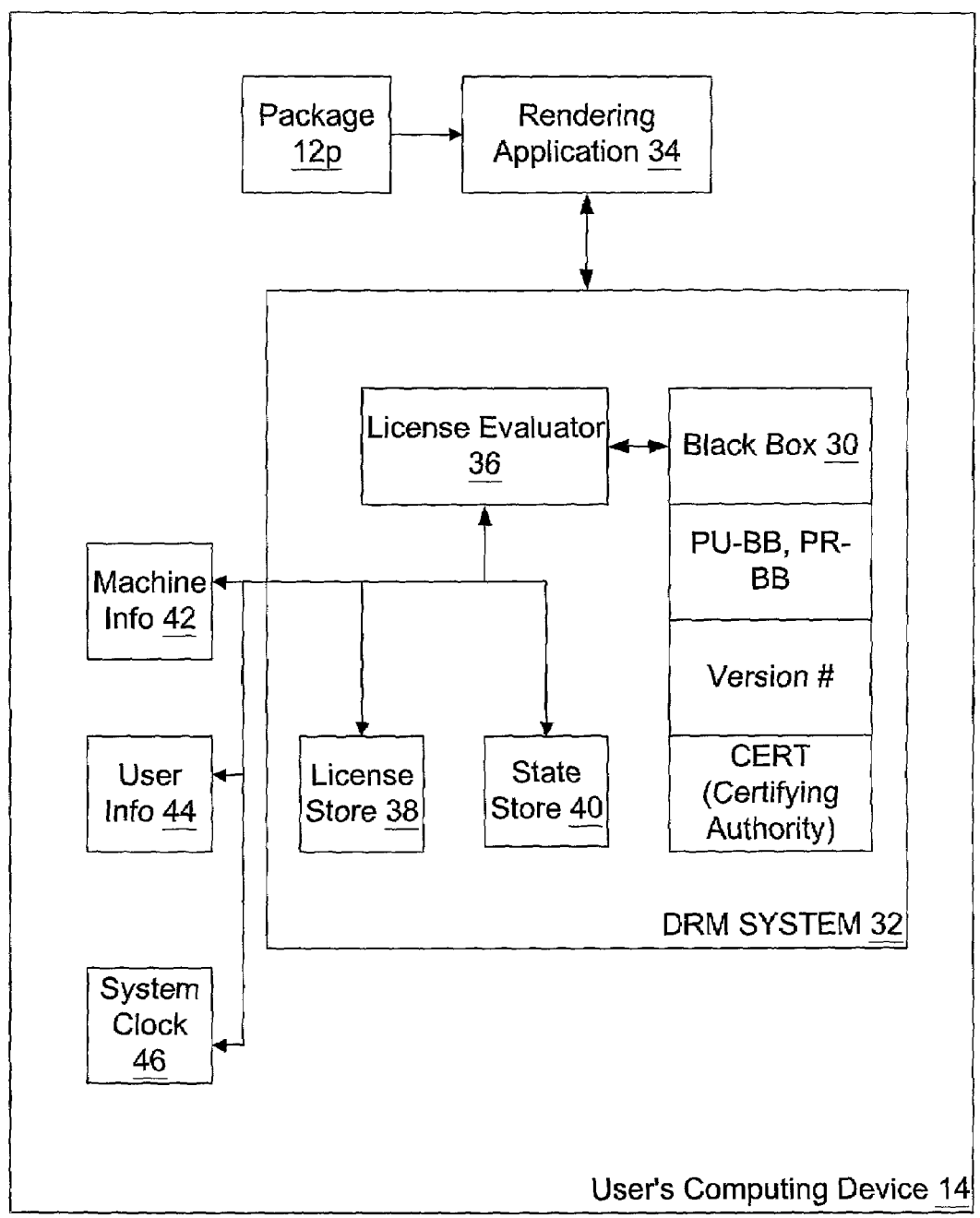
FIG. 4 is a block diagram of the user's computing device of FIG. 1 in accordance with one embodiment of the present invention.

Referring now to FIG. 4, in one embodiment of the present invention, the user's computing device 14 is a personal computer or the like, having elements including a keyboard, a mouse, a screen, a processor, RAM, ROM, a hard drive, a floppy drive, a CD player, and/or the like. However, the user's computing device 14 may also be a dedicated viewing device such as a television or monitor, a dedicated audio device such as a stereo or other music player, a dedicated printer, or the like, among other things, all without departing from the spirit and scope of the present invention.

The content owner for a piece of digital content 12 must trust that the user's computing device 14 will abide by the rules specified by such content owner, i.e. that the digital content 12 will not be rendered unless the user obtains a license 16 that permits the rendering in the manner sought. Preferably, then, the user's computing device 14 must provide a trusted component or mechanism 32 that can satisfy to the content owner that such computing device 14 will not render the digital content 12 except according to the license rules embodied in the license 16 associated with the digital content 12 and obtained by the user.

Here, the trusted mechanism 32 is a Digital Rights Management (DRM) system 32 that is enabled when a user requests that a piece of digital content 12 be rendered, that determines whether the user has a license 16 to render the digital content 12 in the manner sought, that effectuates obtaining such a license 16 if necessary, that determines whether the user has the right to play the digital content 12 according to the license 16, and that decrypts the digital content 12 for rendering purposes if in fact the user has such right according to such license 16. The contents and function of the DRM system 32 on the user's computing device 14 and in connection with the architecture 10 are described below.

DRM System 32

The DRM system 32 performs four main functions with the architecture 10 disclosed herein: (1) content acquisition, (2) license acquisition, (3) content rendering, and (4) black box 30 installation/update. Preferably, any of the functions can be performed at any time, although it is recognized that some of the functions already require that digital content 12 be acquired.

DRM System 32—Content Acquisition

Acquisition of digital content 12 by a user and/or the user's computing device 14 is typically a relatively straightforward matter and generally involves placing a file having encrypted digital content 12 on the user's computing device 14. Of course, to work with the architecture 10 and the DRM system 32 disclosed herein, it is necessary that the encrypted digital content 12 be in a form that is amenable to such architecture 10 and DRM system 32, such as the digital package 12p as will be described below.

As should be understood, the digital content 12 may be obtained in any manner from a content server 22, either directly or indirectly, without departing from the spirit and scope of the present invention. For example, such digital content 12 may be downloaded from a network such as the Internet, located on an obtained optical or magnetic disk or the like, received as part of an E-mail message or the like, or downloaded from an electronic bulletin board or the like.

Such digital content 12, once obtained, is preferably stored in a manner such that the obtained digital content 12 is accessible by a rendering application 34 (to be described below) running on the computing device 14, and by the DRM system 32. For example, the digital content 12 may be placed as a file on a hard drive (not shown) of the user's computing device 14, or on a network server (not shown) accessible to the computing device 14. In the case where the digital content 12 is obtained on an optical or magnetic disk or the like, it may only be necessary that such disk be present in an appropriate drive (not shown) coupled to the user's computing device 14.

In the present invention, it is not envisioned that any special tools are necessary to acquire digital content 12, either from the content server 22 as a direct distribution source or from some intermediary as an indirect distribution source. That is, it is preferable that digital content 12 be as easily acquired as any other data file. However, the DRM system 32 and/or the rendering application 34 may include an interface (not shown) designed to assist the user in obtaining digital content 12. For example, the interface may include a web browser especially designed to search for digital content 12, links to pre-defined Internet web sites that are known to be sources of digital content 12, and the like.

DRM System 32—Content Rendering, Part 1

Figure 5A:
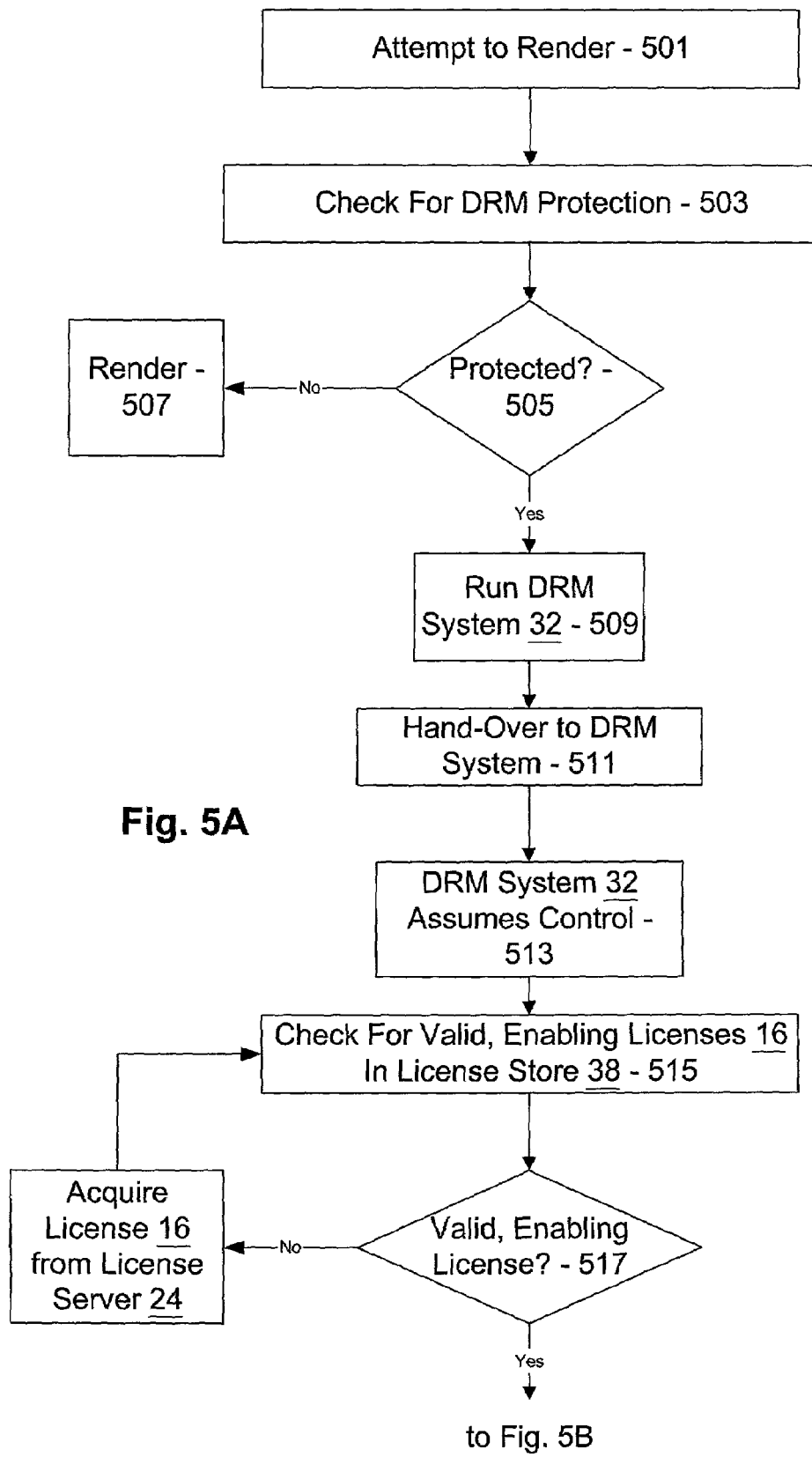
FIGS. 5A and 5B are flow diagrams showing the steps performed in connection with the Digital Rights Management (DRM) system of the computing device of FIG. 4 to render content in accordance with one embodiment of the present invention.

Referring now to FIG. 5A, in one embodiment of the present invention, assuming the encrypted digital content 12 has been distributed to and received by a user and placed by the user on the computing device 14 in the form of a stored file, the user will attempt to render the digital content 12 by executing some variation on a render command (step 501). For example, such render command may be embodied as a request to 'play' or 'open' the digital content 12. In some computing environments, such as for example the "MICROSOFT WINDOWS" operating system, distributed by MICROSOFT Corporation of Redmond, Washington, such play or open command may be as simple as 'clicking' on an icon representative of the digital content 12. Of course, other embodiments of such render command may be employed without departing from the spirit and scope of the present invention. In general, such render command may be considered to be executed whenever a user directs that a file having digital content 12 be opened, run, executed, and/or the like.

Importantly, and in addition, such render command may be embodied as a request to copy the digital content 12 to another form, such as to a printed form, a visual form, an audio form, etc. As should be understood, the same digital content 12 may be rendered in one form, such as on a computer screen, and then in another form, such as a printed document. In the present invention, each type of rendering is performed only if the user has the right to do so, as will be explained below.

In one embodiment of the present invention, the digital content 12 is in the form of a digital file having a file name ending with an extension, and the computing device 14 can determine based on such extension to start a particular kind of rendering application 34. For example, if the file name extension indicates that the digital content 12 is a text file, the rendering application 34 is some form of word processor such as the "MICROSOFT WORD", distributed by MICROSOFT Corporation of Redmond, Wash. Likewise, if the file name extension indicates that the digital content 12 is an audio, video, and/or multimedia file, the rendering application 34 is some form of multimedia player, such as "MICROSOFT MEDIA PLAYER", also distributed by MICROSOFT Corporation of Redmond, Wash.

Of course, other methods of determining a rendering application may be employed without departing from the spirit and scope of the present invention. As but one example, the digital content 12 may contain meta-data in an un-encrypted form (i.e., the aforementioned header information), where the meta-data includes information on the type of rendering application 34 necessary to render such digital content 12.

Preferably, such rendering application 34 examines the digital content 12 associated with the file name and determines whether such digital content 12 is encrypted in a rights-protected form (steps 503, 505). If not protected, the digital content 12 may be rendered without further ado (step 507). If protected, the rendering application 34 determines from the encrypted digital content 12 that the DRM system 32 is necessary to play such digital content 12. Accordingly, such rendering application 34 directs the user's computing device 14 to run the DRM system 32 thereon (step 509). Such rendering application 34 then calls such DRM system 32 to decrypt the digital content 12 (step 511). As will be discussed in more detail below, the DRM system 32 in fact decrypts the digital content 12 only if the user has a valid license 16 for such digital content 12 and the right to play the digital content 12 according to the license rules in the valid license 16. Preferably, once the DRM system 32 has been called by the rendering application 34, such DRM system 32 assumes control from the rendering application 34, at least for purposes of determining whether the user has a right to play such digital content 12 (step 513).

DRM System 32 Components

In one embodiment of the present invention, and referring again to FIG. 4, the DRM system 32 includes a license evaluator 36, the black box 30, a license store 38, and a state store 40.

DRM System 32 Components—License Evaluator 36

The license evaluator 36 locates one or more licenses 16 that correspond to the requested digital content 12, determines whether such licenses 16 are valid, reviews the license rules in such valid licenses 16, and determines based on the reviewed license rules whether the requesting user has the right to render the requested digital content 12 in the manner sought, among other things. As should be understood, the license evaluator 36 is a trusted component in the DRM system 32. In the present disclosure, to be 'trusted' means that the license server 24 (or any other trusting element) is satisfied that the trusted element will carry out the wishes of the owner of the digital content 12 according to the rights description in the license 16, and that a user cannot easily alter such trusted element for any purpose, nefarious or otherwise.

The license evaluator 36 has to be trusted in order to ensure that such license evaluator 36 will in fact evaluate a license 16 properly, and to ensure that such license evaluator 36 has not been adulterated or otherwise modified by a user for the purpose of bypassing actual evaluation of a license 16. Accordingly, the license evaluator 36 is run in a protected or shrouded environment such that the user is denied access to such license evaluator 36. Other protective measures may of course be employed in connection with the license evaluator 36 without departing from the spirit and scope of the present invention.

DRM System 32 Components—Black Box 30

Primarily, and as was discussed above, the black box 30 performs encryption and decryption functions in the DRM system 32. In particular, the black box 30 works in conjunction with the license evaluator 36 to decrypt and encrypt certain information as part of the license evaluation function. In addition, once the license evaluator 36 determines that a user does in fact have the right to render the requested digital content 12 in the manner sought, the black box 30 is provided with a decryption key (KD) for such digital content 12, and performs the function of decrypting such digital content 12 based on such decryption key (KD).

The black box 30 is also a trusted component in the DRM system 32. In particular, the license server 24 must trust that the black box 30 will perform the decryption function only in accordance with the license rules in the license 16, and also trust that such black box 30 will not operate should it become adulterated or otherwise modified by a user for the nefarious purpose of bypassing actual evaluation of a license 16. Accordingly, the black box 30 is also run in a protected or shrouded environment such that the user is denied access to such black box 30. Again, other protective measures may be employed in connection with the black box 30 without departing from the spirit and scope of the present invention. Preferably, and like the content server 22 and license server 24, the black box 30 in the DRM system 32 has a unique public/private key pair (PU-BB, PR-BB) that is employed as part of the process of evaluating the license 16 and obtaining a decryption key (KD) for decrypting the digital content 12, as will be described in more detail below.

DRM System 32 Components—License Store 38

The license store 38 stores licenses 16 received by the DRM system 32 for corresponding digital content 12. The license store 38 itself need not be trusted since the license store 38 merely stores licenses 16, each of which already has trust components built thereinto, as will be described below. In one embodiment of the present invention, the license store 38 is merely a sub-directory of a drive such as a hard disk drive or a network drive. However, the license store 38 may be embodied in any other form without departing from the spirit and scope of the present invention, so long as such license store 38 performs the function of storing licenses 16 in a location relatively convenient to the DRM system 32.

DRM System 32 Components—State Store 40

The state store 40 performs the function of maintaining state information corresponding to licenses 16 presently or formerly in the license store 38. Such state information is created by the DRM system 32 and stored in the state store 40 as necessary. For example, if a particular license 16 only allows a pre-determined number of renderings of a piece of corresponding digital content 12, the state store 40 maintains state information on how many renderings have in fact taken place in connection with such license 16. The state store 40 continues to maintain state information on licenses 16 that are no longer in the license store 38 to avoid the situation where it would otherwise be advantageous to delete a license 16 from the license store 38 and then obtain an identical license 16 in an attempt to delete the corresponding state information from the state store 40.

The state store 40 also has to be trusted in order to ensure that the information stored therein is not reset to a state more favorable to a user. Accordingly, the state store 40 is likewise run in a protected or shrouded environment such that the user is denied access to such state store 40. Once again, other protective measures may of course be employed in connection with the state store 40 without departing from the spirit and scope of the present invention. For example, the state store 40 may be stored by the DRM system 32 on the computing device 14 in an encrypted form.

DRM System 32—Content Rendering, Part 2

Figure 7:
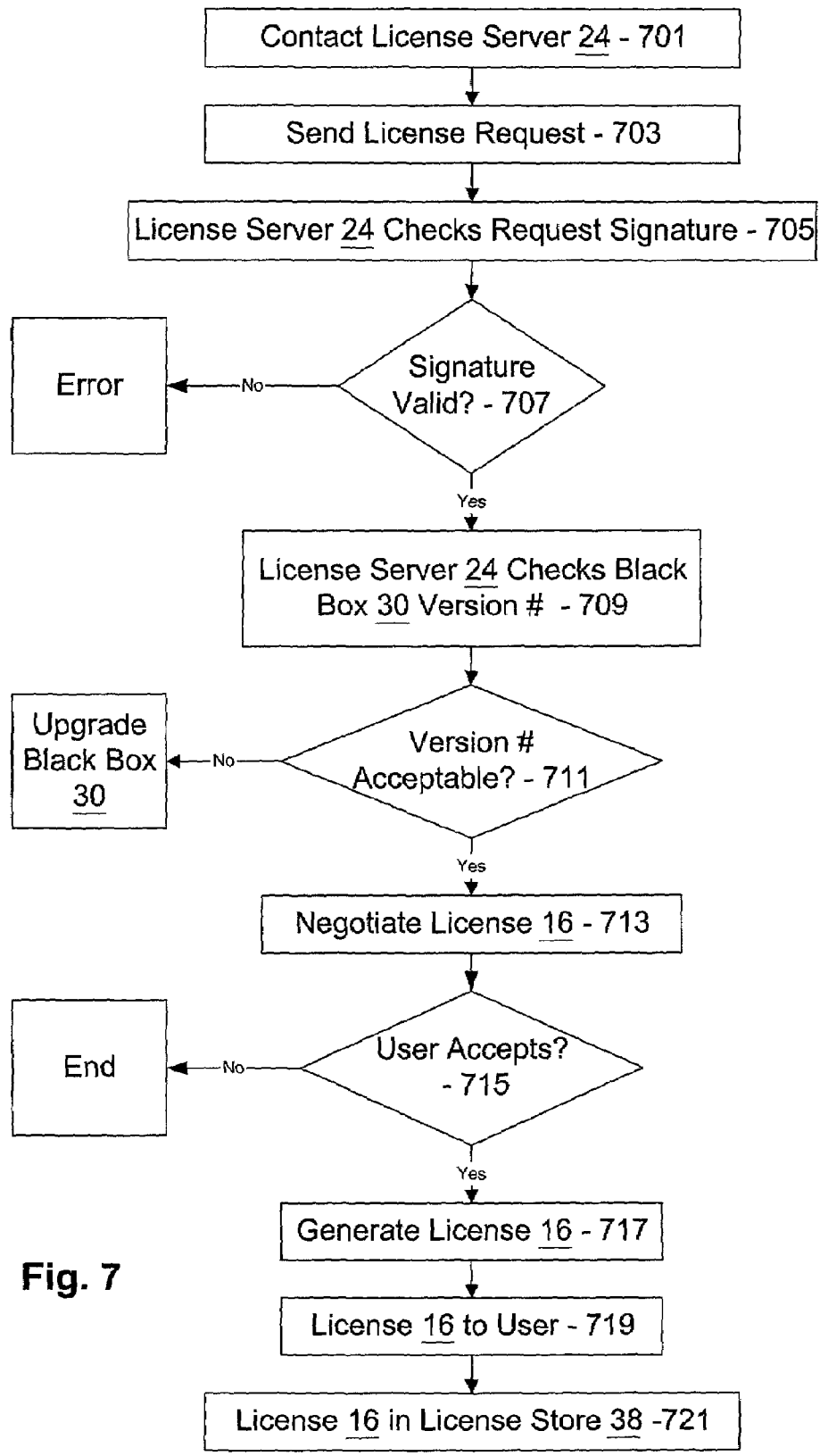
FIG. 7 is a flow diagram showing the steps performed in connection with the DRM system of FIG. 4 to obtain a license in accordance with one embodiment of the present invention.

Referring again to FIG. 5A, and again discussing content rendering in one embodiment of the present invention, once the DRM system 32 has assumed control from the calling rendering application 34, such DRM system 32 then begins the process of determining whether the user has a right to render the requested digital content 12 in the manner sought. In particular, the DRM system 32 either locates a valid, enabling license 16 in the license store (steps 515, 517) or attempts to acquire a valid, enabling license 16 from the license server 24 (i.e. performs the license acquisition function as discussed below and as shown in FIG. 7).

Figure 6:
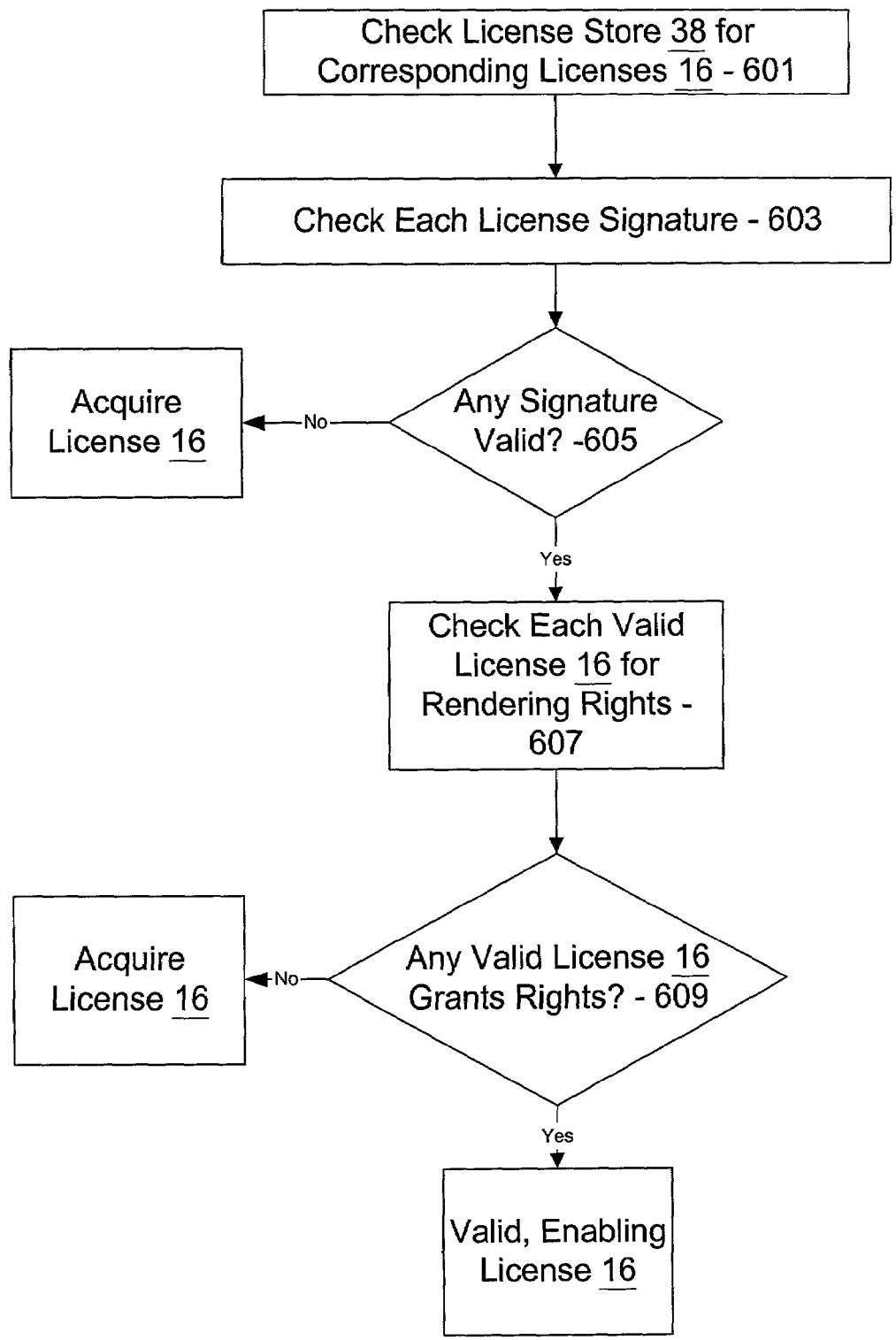
FIG. 6 is a flow diagram showing the steps performed in connection with the DRM system of FIG. 4 to determine whether any valid, enabling licenses are present in accordance with one embodiment of the present invention.

As a first step, and referring now to FIG. 6, the license evaluator 36 of such DRM system 32 checks the license store 38 for the presence of one or more received licenses 16 that correspond to the digital content 12 (step 601). Typically, the license 16 is in the form of a digital file, as will be discussed below, although it will be recognized that the license 16 may also be in other forms without departing from the spirit and scope of the present invention. Typically, the user will receive the digital content 12 without such license 16, although it will likewise be recognized that the digital content 12 may be received with a corresponding license 16 without departing from the spirit and scope of the present invention.

As was discussed above in connection with FIG. 3, each piece of digital content 12 is in a package 12p with a content ID (or package ID) identifying such digital content 12 (or package 12p), and a key ID identifying the decryption key (KD) that will decrypt the encrypted digital content 12. Preferably, the content ID (or package ID) and the key ID are in an un-encrypted form. Accordingly, and in particular, based on the content ID of the digital content 12, the license evaluator 36 looks for any license 16 in the license store 38 that contains an identification of applicability to such content ID. Note that multiple such licenses 16 may be found, especially if the owner of the digital content 12 has specified several different kinds of licenses 16 for such digital content 12, and the user has obtained multiple ones of such licenses 16. If in fact the license evaluator 36 does not find in the license store 38 any license 16 corresponding to the requested digital content 12, the DRM system 32 may then perform the function of license acquisition (step 519 of FIG. 5), to be described below.

Assume now that the DRM system 32 has been requested to render a piece of digital content 12, and one or more licenses 16 corresponding thereto are present in the license store 38. In one embodiment of the present invention, then, the license evaluator 36 of the DRM system 32 proceeds to determine for each such license 16 whether such license 16 itself is valid (steps 603 and 605 of FIG. 6). Preferably, and in particular, each license 16 includes a digital signature 26 based on the content 28 of the license 16. As should be understood, the digital signature 26 will not match the license 16 if the content 28 has been adulterated or otherwise modified. Thus, the license evaluator 36 can determine based on the digital signature 26 whether the content 28 is in the form that it was received from the license server 24 (i.e., is valid). If no valid license 16 is found in the license store 38, the DRM system 32 may then perform the license acquisition function described below to obtain such a valid license 16.

Assuming that one or more valid licenses 16 are found, for each valid license 16, the license evaluator 36 of the DRM system 32 next determines whether such valid license 16 gives the user the right to render the corresponding digital content 12 in the manner desired (i.e., is enabling) (steps 607 and 609). In particular, the license evaluator 36 determines whether the requesting user has the right to play the requested digital content 12 based on the rights description in each license 16 and based on what the user is attempting to do with the digital content 12. For example, such rights description may allow the user to render the digital content 12 into a sound, but not into a decrypted digital copy.

As should be understood, the rights description in each license 16 specifies whether the user has rights to play the digital content 12 based on any of several factors, including who the user is, where the user is located, what type of computing device 14 the user is using, what rendering application 34 is calling the DRM system 32, the date, the time, etc. In addition, the rights description may limit the license 16 to a pre-determined number of plays, or pre-determined play time, for example. In such case, the DRM system 32 must refer to any state information with regard to the license 16, (i.e., how many times the digital content 12 has been rendered, the total amount of time the digital content 12 has been rendered, etc.), where such state information is stored in the state store 40 of the DRM system 32 on the user's computing device 14.

Accordingly, the license evaluator 36 of the DRM system 32 reviews the rights description of each valid license 16 to determine whether such valid license 16 confers the rights sought to the user. In doing so, the license evaluator 36 may have to refer to other data local to the user's computing device 14 to perform a determination of whether the user has the rights sought. As seen in FIG. 4, such data may include an identification 42 of the user's computing device (machine) 14 and particular aspects thereof, an identification 44 of the user and particular aspects thereof, an identification of the rendering application 34 and particular aspects thereof, a system clock 46, and the like. If no valid license 16 is found that provides the user with the right to render the digital content 12 in the manner sought, the DRM system 32 may then perform the license acquisition function described below to obtain such a license 16, if in fact such a license 16 is obtainable.

Of course, in some instances the user cannot obtain the right to render the digital content 12 in the manner requested, because the content owner of such digital content 12 has in effect directed that such right not be granted. For example, the content owner of such digital content 12 may have directed that no license 16 be granted to allow a user to print a text document, or to copy a multimedia presentation into an un-encrypted form. In one embodiment of the present invention, the digital content 12 includes data on what rights are available upon purchase of a license 16, and types of licenses 16 available. However, it will be recognized that the content owner of a piece of digital content 12 may at any time change the rights currently available for such digital content 12 by changing the licenses 16 available for such digital content 12.

DRM System 32—License Acquisition

Referring now to FIG. 7, if in fact the license evaluator 36 does not find in the license store 38 any valid, enabling license 16 corresponding to the requested digital content 12, the DRM system 32 may then perform the function of license acquisition. As shown in FIG. 3, each piece of digital content 12 is packaged with information in an un-encrypted form regarding how to obtain a license 16 for rendering such digital content 12 (i.e., license acquisition information).

In one embodiment of the present invention, such license acquisition information may include (among other things) types of licenses 16 available, and one or more Internet web sites or other site information at which one or more appropriate license servers 24 may be accessed, where each such license server 24 is in fact capable of issuing a license 16 corresponding to the digital content 12. Of course, the license 16 may be obtained in other manners without departing from the spirit and scope of the present invention. For example, the license 16 may be obtained from a license server 24 at an electronic bulletin board, or even in person or via regular mail in the form of a file on a magnetic or optical disk or the like.

Assuming that the location for obtaining a license 16 is in fact a license server 24 on a network, the license evaluator 36 then establishes a network connection to such license server 24 based on the web site or other site information, and then sends a request for a license 16 from such connected license server 24 (steps 701, 703). In particular, once the DRM system 32 has contacted the license server 24, such DRM system 32 transmits appropriate license request information 36 to such license server 24. In one embodiment of the present invention, such license 16 request information 36 may include:

the public key of the black box 30 of the DRM system 32 (PU-BB);

the version number of the black box 30 of the DRM system 32;

a certificate with a digital signature from a certifying authority certifying the black box 30 (where the certificate may in fact include the aforementioned public key and version number of the black box 30);

the content ID (or package ID) that identifies the digital content 12 (or package 12p);

the key ID that identifies the decryption key (KD) for decrypting the digital content 12;

the type of license 16 requested (if in fact multiple types are available);

the type of rendering application 34 that requested rendering of the digital content 12;

and/or the like, among other things. Of course, greater or lessor amounts of license 16 request information 36 may be transmitted to the license server 24 by the DRM system 32 without departing from the spirit and scope of the present invention. For example, information on the type of rendering application 34 may not be necessary, while additional information about the user and/or the user's computing device 14 may be necessary.

Once the license server 24 has received the license 16 request information 36 from the DRM system 32, the license server 24 may then perform several checks for trust/authentication and for other purposes. In one embodiment of the present invention, such license server 24 checks the certificate with the digital signature of the certifying authority to determine whether such has been adulterated or otherwise modified (steps 705, 707). If so, the license server 24 refuses to grant any license 16 based on the request information 36. The license server 24 may also maintain a list of known 'bad' users and/or user's computing devices 14, and may refuse to grant any license 16 based on a request from any such bad user and/or bad user's computing device 14 on the list. Such 'bad' list may be compiled in any appropriate manner without departing from the spirit and scope of the present invention.

Based on the received request and the information associated therewith, and particularly based on the content ID (or package ID) in the license request information, the license server 24 can interrogate the content-key database 20 (FIG. 1) and locate a record corresponding to the digital content 12 (or package 12p) that is the basis of the request. As was discussed above, such record contains the decryption key (KD), key ID, and content ID for such digital content 12. In addition, such record may contain license data regarding the types of licenses 16 to be issued for the digital content 12 and the terms and conditions for each type of license 16. Alternatively, such record may include a pointer, link, or reference to a location having such additional information.

As mentioned above, multiple types of licenses 16 may be available. For example, for a relatively small license fee, a license 16 allowing a limited number of renderings may be available. For a relatively greater license fee, a license 16 allowing unlimited renderings until an expiration date may be available. For a still greater license fee, a license 16 allowing unlimited renderings without any expiration date may be available. Practically any type of license 16 having any kind of license terms may be devised and issued by the license server 24 without departing from the spirit and scope of the present invention.

In one embodiment of the present invention, the request for a license 16 is accomplished with the aid of a web page or the like as transmitted from the license server 24 to the user's computing device 14. Preferably, such web page includes information on all types of licenses 16 available from the license server 24 for the digital content 12 that is the basis of the license 16 request.

In one embodiment of the present invention, prior to issuing a license 16, the license server 24 checks the version number of the black box 30 to determine whether such black box 30 is relatively current (steps 709, 711). As should be understood, the black box 30 is intended to be secure and protected from attacks from a user with nefarious purposes (i.e., to improperly render digital content 12 without a license 16, or outside the terms of a corresponding license 16). However, it is to be recognized that no system and no software device is in fact totally secure from such an attack.

As should also be understood, if the black box 30 is relatively current, i.e., has been obtained or updated relatively recently, it is less likely that such black box 30 has been successfully attacked by such a nefarious user. Preferably, and as a matter of trust, if the license server 24 receives a license request with request information 36 including a black box 30 version number that is not relatively current, such license server 24 refuses to issue the requested license 16 until the corresponding black box 30 is upgraded to a current version, as will be described below. Put simply, the license server 24 will not trust such black box 30 unless such black box 30 is relatively current.

In the context of the black box 30 of the present invention, the term 'current' or 'relatively current' may have any appropriate meaning without departing from the spirit and scope of the present invention, consistent with the function of providing trust in the black box 30 based on the age or use thereof. For example, 'current' may be defined according to age (i.e., less than one month old). As an alternative example, 'current' may be defined based on a number of times that the black box 30 has decrypted digital content 12 (i.e., less than 200 instances of decryption). Moreover, 'current' may be based on policy as set by each license server 24, where one license server 24 may define 'current' differently from another license server 24, and a license server 24 may further define 'current' differently depending on the digital content 12 for which a license 16 is requested, or depending on the type of license 16 requested, among other things.

Assuming that the license server 24 is satisfied from the version number of a black box 30 or other indicia thereof that such black box 30 is current, the license server 24 then proceeds to negotiate terms and conditions for the license 16 with the user (step 713). Alternatively, the license server 24 negotiates the license 16 with the user, then satisfies itself from the version number of the black box 30 that such black box 30 is current (i.e., performs step 713, then step 711). Of course, the amount of negotiation varies depending on the type of license 16 to be issued, and other factors. For example, if the license server 24 is merely issuing a paid-up unlimited use license 16, very little need be negotiated. On the other hand, if the license 16 is to be based on such items as varying values, sliding scales, break points, and other details, such items and details may need to be worked out between the license server 24 and the user before the license 16 can be issued.

As should be understood, depending on the circumstances, the license negotiation may require that the user provide further information to the license server 24 (for example, information on the user, the user's computing device 14, etc.). Importantly, the license negotiation may also require that the user and the license server 24 determine a mutually acceptable payment instrument (a credit account, a debit account, a mailed check, etc.) and/or payment method (paid-up immediately, spread over a period of time, etc.), among other things.

Once all the terms of the license 16 have been negotiated and agreed to by both the license server 24 and user (step 715), a digital license 16 is generated by the license server 24 (step 719), where such generated license 16 is based at least in part on the license request, the black box 30 public key (PU-BB), and the decryption key (KD) for the digital content 12 that is the basis of the request as obtained from the content-key database 20. In one embodiment of the present invention, and as seen in FIG. 8, the generated license 16 includes:

the content ID of the digital content 12 to which the license 16 applies;
  a Digital Rights License (DRL) 48 (i.e., the rights description or actual terms and conditions of the license 16 written in a predetermined form that the license evaluator 36 can interrogate), perhaps encrypted with the decryption key (KD) (i.e., KD (DRL));
  the decryption key (KD) for the digital content 12 encrypted with the black box 30 public key (PU-BB) as receive in the license request (i.e.,(PU-BB (KD));
  a digital signature from the license server 24 (without any attached certificate) based on (KD (DRL)) and (PU-BB (KD)) and encrypted with the license server 24 private key (i.e., (S (PR-LS))); and
  the certificate that the license server 24 obtained previously from the content server 22, such certificate indicating that the license server 24 has the authority from the content server 22 to issue the license 16 (i.e., (CERT (PU-LS) S (PR-CS))).

As should be understood, the aforementioned elements and perhaps others are packaged into a digital file or some other appropriate form. As should also be understood, if the DRL 48 or (PU-BB (KD)) in the license 16 should become adulterated or otherwise modified, the digital signature (S (PR-LS)) in the license 16 will not match and therefore will not validate such license 16. For this reason, the DRL 48 need not necessarily be in an encrypted form (i.e., (KD (DRL)) as mentioned above), although such encrypted form may in some instances be desirable and therefore may be employed without departing from the spirit and scope of the present invention.

Once the digital license 16 has been prepared, such license 16 is then issued to the requestor (i.e., the DRM system 32 on the user's computing device 14) (step 719 of FIG. 7). Preferably, the license 16 is transmitted over the same path through which the request therefor was made (i.e., the Internet or another network), although another path may be employed without departing from the spirit and scope of the present invention. Upon receipt, the requesting DRM system 32 preferably automatically places the received digital license 16 in the license store 38 (step 721).

It is to be understood that a user's computing device 14 may on occasion malfunction, and licenses 16 stored in the license store 38 of the DRM system 32 on such user's computing device 14 may become irretrievably lost. Accordingly, it is preferable that the license server 24 maintain a database 50 of issued licenses 16 (FIG. 1), and that such license server 24 provide a user with a copy or re-issue (hereinafter 're-issue') of an issued license 16 if the user is in fact entitled to such re-issue. In the aforementioned case where licenses 16 are irretrievably lost, it is also likely the case that state information stored in the state store 40 and corresponding to such licenses 16 is also lost. Such lost state information should be taken into account when re-issuing a license 16. For example, a fixed number of renderings license 16 might legitimately be re-issued in a pro-rated form after a relatively short period of time, and not re-issued at all after a relatively longer period of time.

DRM System 32—Installation/Upgrade of Black Box 30

As was discussed above, as part of the function of acquiring a license 16, the license server 24 may deny a request for a license 16 from a user if the user's computing device 14 has a DRM system 32 with a black box 30 that is not relatively current, i.e., has a relatively old version number. In such case, it is preferable that the black box 30 of such DRM system 32 be upgraded so that the license acquisition function can then proceed. Of course, the black box 30 may be upgraded at other times without departing from the spirit and scope of the present invention.

Preferably, as part of the process of installing the DRM system 32 on a user's computing device 14, a non-unique 'lite' version of a black box 30 is provided. Such 'lite' black box 30 is then upgraded to a unique regular version prior to rendering a piece of digital content 12. As should be understood, if each black box 30 in each DRM system 32 is unique, a security breach into one black box 30 cannot easily be replicated with any other black box 30.

Figure 9:
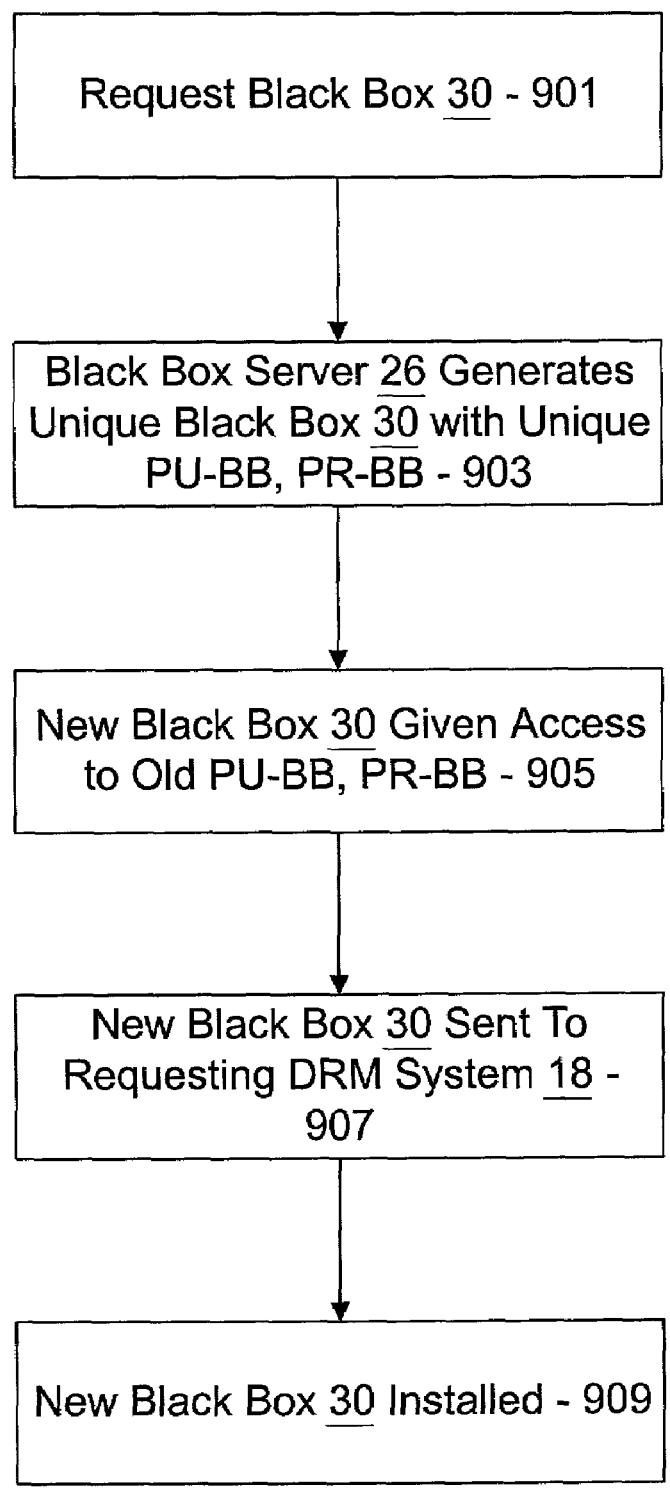
FIG. 9 is a flow diagram showing the steps performed in connection with the DRM system of FIG. 4 to obtain a new black box in accordance with one embodiment of the present invention.

Referring now to FIG. 9, the DRM system 32 obtains the unique black box 30 by requesting same from a black box server 26 or the like (as was discussed above and as shown in FIG. 1) (step 901). Typically, such request is made by way of the Internet, although other means of access may be employed without departing from the spirit and scope of the present invention. For example, the connection to a black box server 26 may be a direct connection, either locally or remotely. An upgrade from one unique non-lite black box 30 to another unique non-lite black box 30 may also be requested by the DRM system 32 at any time, such as for example a time when a license server 24 deems the black box 30 not current, as was discussed above.

Thereafter, the black box server 26 generates a new unique black box 30 (step 903). As seen in FIG. 3, each new black box 30 is provided with a version number and a certificate with a digital signature from a certifying authority. As was discussed above in connection with the license acquisition function, the version number of the black box 30 indicates the relative age and/or use thereof. The certificate with the digital signature from the certifying authority, also discussed above in connection with the license acquisition function, is a proffer or vouching mechanism from the certifying authority that a license server 24 should trust the black box 30. Of course, the license server 24 must trust the certifying authority to issue such a certificate for a black box 30 that is in fact trustworthy. It may be the case, in fact, that the license server 24 does not trust a particular certifying authority, and refuses to honor any certificate issued by such certifying authority. Trust may not occur, for example, if a particular certifying authority is found to be engaging in a pattern of improperly issuing certificates.

Preferably, and as was discussed above, the black box server 26 includes a new unique public/private key pair (PU-BB, PR-BB) with the newly generated unique black box 30 (step 903 of FIG. 9). Preferably, the private key for the black box 30 (PR-BB) is accessible only to such black box 30, and is hidden from and inaccessible by the remainder of the world, including the computing device 14 having the DRM system 32 with such black box 30, and the user thereof.

Most any hiding scheme may be employed without departing from the spirit and scope of the present invention, so long as such hiding scheme in fact performs the function of hiding the private key (PR-BB) from the world. As but one example, the private key (PR-BB) may be split into several sub-components, and each sub-component may be encrypted uniquely and stored in a different location. In such a situation, it is preferable that such sub-components are never assembled in full to produce the entire private key (PR-BB).

In one embodiment of the present invention, such private key (PR-BB) is encrypted according to code-based encryption techniques. In particular, in such embodiment, the actual software code of the black box 30 (or other software code) is employed as encrypting key(s). Accordingly, if the code of the black box 30 (or the other software code) becomes adulterated or otherwise modified, for example by a user with nefarious purposes, such private key (PR-BB) cannot be decrypted.

Although each new black box 30 is delivered with a new public/private key pair (PU-BB, PR-BB), such new black box 30 is also preferably given access to old public/private key pairs from old black boxes 30 previously delivered to the DRM system 32 on the user's computing device 14 (step 905). Accordingly, the upgraded black box 30 can still employ the old key pairs to access older digital content 12 and older corresponding licenses 16 that were generated according to such old key pairs, as will be discussed in more detail below.

Preferably, the upgraded black box 30 delivered by the black box server 26 is tightly tied to or associated with the user's computing device 14. Accordingly, the upgraded black box 30 cannot be operably transferred among multiple computing devices 14 for nefarious purposes or otherwise. In one embodiment of the present invention, as part of the request for the black box 30 (step 901) the DRM system 32 provides hardware information unique to such DRM system 32 and/or unique to the user's computing device 14 to the black box server 26, and the black box server 26 generates a black box 30 for the DRM system 32 based in part on such provided hardware information. Such generated upgraded black box 30 is then delivered to and installed in the DRM system 32 on the user's computing device 14 (steps 907, 909). If the upgraded black box 30 is then somehow transferred to another computing device 14, the transferred black box 30 recognizes that it is not intended for such other computing device 14, and does not allow any requested rendering to proceed on such other computing device 14.

Once the new black box 30 is installed in the DRM system 32, such DRM system 32 can proceed with a license acquisition function or with any other function.

DRM System 32—Content Rendering, Part 3

Figure 5B:
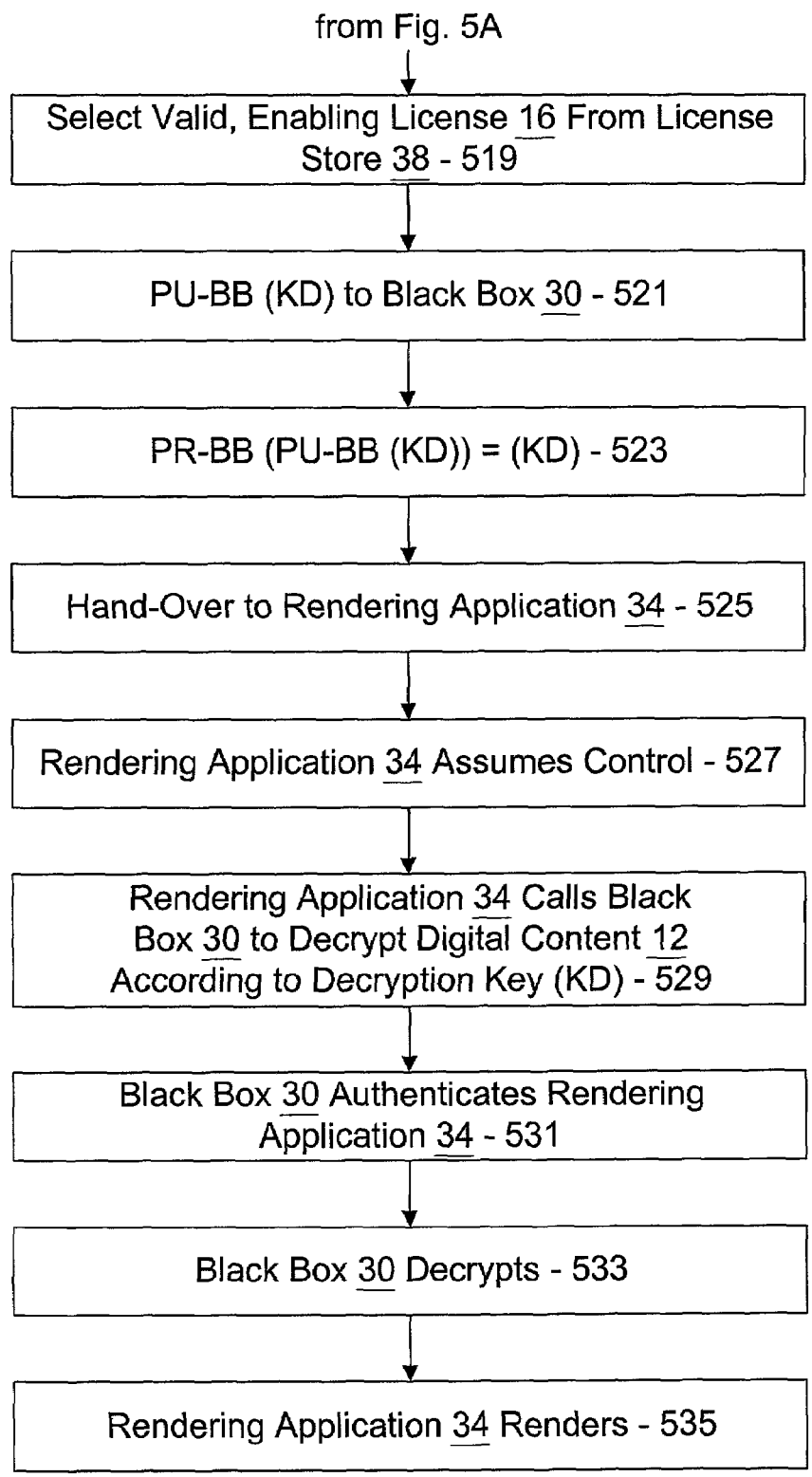

Referring now to FIG. 5B, and assuming, now, that the license evaluator 36 has found at least one valid license 16 and that at least one of such valid licenses 16 provides the user with the rights necessary to render the corresponding digital content 12 in the manner sought (i.e., is enabling), the license evaluator 36 then selects one of such licenses 16 for further use (step 519). Specifically, to render the requested digital content 12, the license evaluator 36 and the black box 30 in combination obtain the decryption key (KD) from such license 16, and the black box 30 employs such decryption key (KD) to decrypt the digital content 12. In one embodiment of the present invention, and as was discussed above, the decryption key (KD) as obtained from the license 16 is encrypted with the black box 30 public key (PU-BB(KD)), and the black box 30 decrypts such encrypted decryption key with its private key (PR-BB) to produce the decryption key (KD) (steps 521, 523). However, other methods of obtaining the decryption key (KD) for the digital content 12 may be employed without departing from the spirit and scope of the present invention.

Once the black box 30 has the decryption key (KD) for the digital content 12 and permission from the license evaluator 36 to render the digital content 12, control may be returned to the rendering application 34 (steps 525, 527). In one embodiment of the present invention, the rendering application 34 then calls the DRM system 32/black box 30 and directs at least a portion of the encrypted digital content 12 to the black box 30 for decryption according to the decryption key (KD) (step 529). The black box 30 decrypts the digital content 12 based upon the decryption key (KD) for the digital content 12, and then the black box 30 returns the decrypted digital content 12 to the rendering application 34 for actual rendering (steps 533, 535). The rendering application 34 may either send a portion of the encrypted digital content 12 or the entire digital content 12 to the black box 30 for decryption based on the decryption key (KD) for such digital content 12 without departing from the spirit and scope of the present invention.

Preferably, when the rendering application 34 sends digital content 12 to the black box 30 for decryption, the black box 30 and/or the DRM system 32 authenticates such rendering application 34 to ensure that it is in fact the same rendering application 34 that initially requested the DRM system 32 to run (step 531). Otherwise, the potential exists that rendering approval may be obtained improperly by basing the rendering request on one type of rendering application 34 and in fact rendering with another type of rendering application 34. Assuming the authentication is successful and the digital content 12 is decrypted by the black box 30, the rendering application 34 may then render the decrypted digital content 12 (steps 533, 535).

Sequence of Key Transactions

Figure 10:
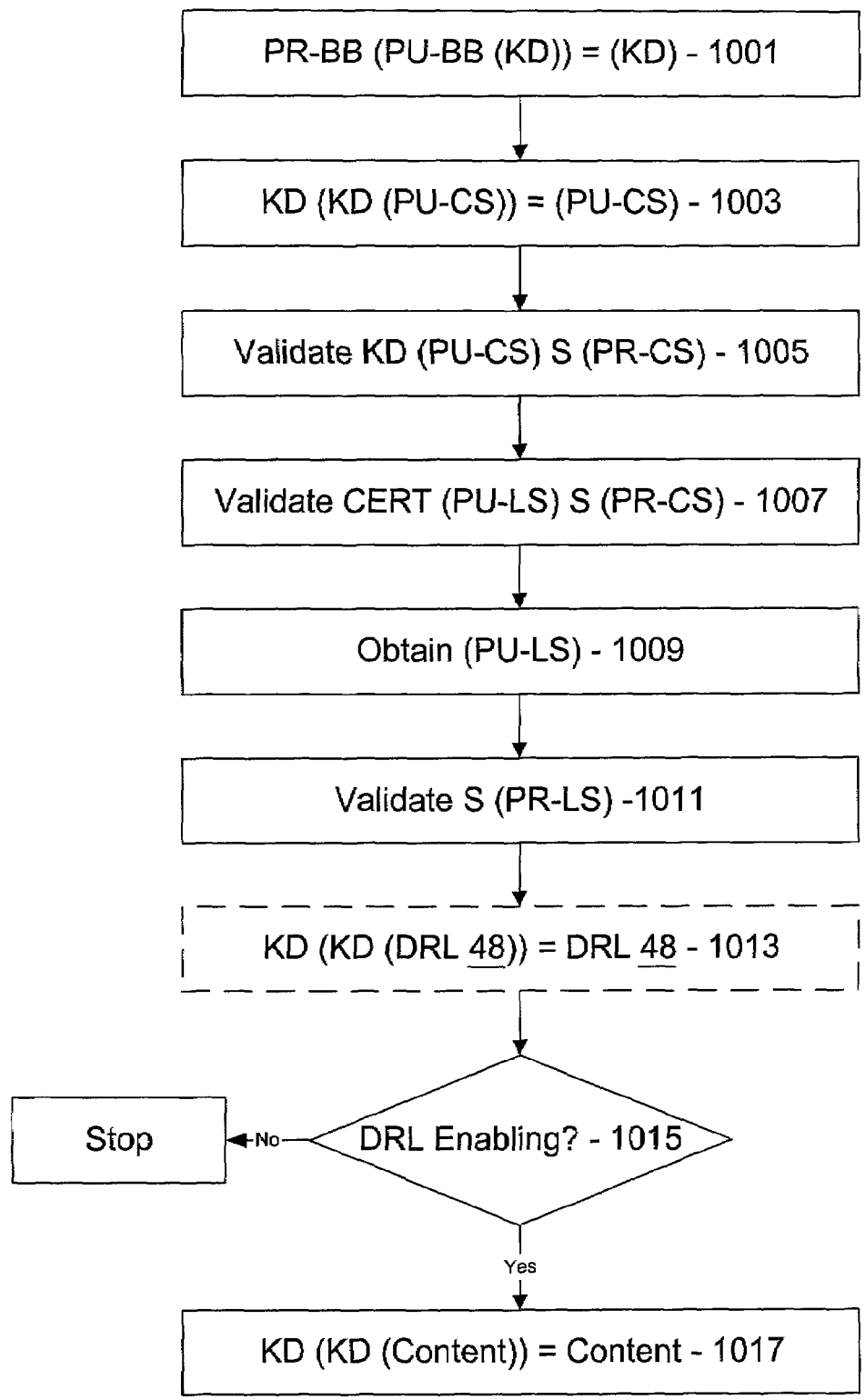
FIG. 10 is a flow diagram showing the key transaction steps performed in connection with the DRM system of FIG. 4 to validate a license and a piece of digital content and render the content in accordance with one embodiment of the present invention.

Referring now to FIG. 10, in one embodiment of the present invention, a sequence of key transactions is performed to obtain the decryption key (KD) and evaluate a license 16 for a requested piece of digital content 12 (i.e., to perform steps 515–523 of FIGS. 5A and 5B). Mainly, in such sequence, the DRM system 32 obtains the decryption key (KD) from the license 16, uses information obtained from the license 16 and the digital content 12 to authenticate or ensure the validity of both, and then determines whether the license 16 in fact provides the right to render the digital content 12 in the manner sought. If so, the digital content 12 may be rendered.

Bearing in mind that each license 16 for the digital content 12, as seen in FIG. 8, includes:
  the content ID of the digital content 12 to which the license 16 applies;
  the Digital Rights License (DRL) 48, perhaps encrypted with the decryption key (KD) (i.e., KD (DRL));
  the decryption key (KD) for the digital content 12 encrypted with the black box 30 public key (PU-BB) (i.e.,(PU-BB (KD));
  the digital signature from the license server 24 based on (KD (DRL)) and (PU-BB (KD)) and encrypted with the license server 24 private key (i.e., (S (PR-LS))); and
  the certificate that the license server 24 obtained previously from the content server 22 (i.e., (CERT (PU-LS) S (PR-CS))), and also bearing in mind that the package 12p having the digital content 12, as seen in FIG. 3, includes:
  the content ID of such digital content 12;
  the digital content 12 encrypted by KD (i.e., (KD(CONTENT)));
  a license acquisition script that is not encrypted; and
  the key KD encrypting the content server 22 public key (PU-CS), signed by the content server 22 private key (PR-CS) (i.e., (KD (PU-CS) S (PR-CS))), in one embodiment of the present invention, the specific sequence of key transactions that are performed with regard to a specific one of the licenses 16 for the digital content 12 is as follows:

1. Based on (PU-BB (KD)) from the license 16, the black box 30 of the DRM system 32 on the user's computing device 14 applies its private key (PR-BB) to obtain (KD) (step 1001). (PR-BB (PU-BB (KD))=(KD)). Note, importantly, that the black box 30 could then proceed to employ KD to decrypt the digital content 12 without any further ado. However, and also importantly, the license server 24 trusts the black box 30 not to do so. Such trust was established at the time such license server 24 issued the license 16 based on the certificate from the certifying authority vouching for the trustworthiness of such black box 30. Accordingly, despite the black box 30 obtaining the decryption key (KD) as an initial step rather than a final step, the DRM system 32 continues to perform all license 16 validation and evaluation functions, as described below.

2. Based on (KD (PU-CS) S (PR-CS)) from the digital content 12, the black box 30 applies the newly obtained decryption key (KD) to obtain (PU-CS) (step 1003). (KD (KD (PU-CS)) =(PU-CS)). Additionally, the black box 30 can apply (PU-CS) as against the signature (S (PR-CS)) to satisfy itself that such signature and such digital content 12/package 12p is valid (step 1005). If not valid, the process is halted and access to the digital content 12 is denied.

3. Based on (CERT (PU-LS) S (PR-CS)) from the license 16, the black box 30 applies the newly obtained content server 22 public key (PU-CS) to satisfy itself that the certificate is valid (step 1007), signifying that the license server 24 that issued the license 16 had the authority from the content server 22 to do so, and then examines the certificate contents to obtain (PU-LS) (step 1009). If not valid, the process is halted and access to the digital content 12 based on the license 16 is denied.

4. Based on (S (PR-LS)) from the license 16, the black box 30 applies the newly obtained license server 24 public key (PU-LS) to satisfy itself that the license 16 is valid (step 1011). If not valid, the process is halted and access to the digital content 12 based on the license 16 is denied.

5. Assuming all validation steps are successful, and that the DRL 48 in the license 16 is in fact encrypted with the decryption key (KD), the license evaluator 36 then applies the already-obtained decryption key (KD) to (KD(DRL)) as obtained from the license 16 to obtain the license terms from the license 16 (i.e., the DRL 48) (step 1013). Of course, if the DRL 48 in the license 16 is not in fact encrypted with the decryption key (KD), step 1013 may be omitted. The license evaluator 36 then evaluates/interrogates the DRL 48 and determines whether the user's computing device 14 has the right based on the DRL 48 in the license 16 to render the corresponding digital content 12 in the manner sought (i.e., whether the DRL 48 is enabling) (step 1015). If the license evaluator 36 determines that such right does not exist, the process is halted and access to the digital content 12 based on the license 16 is denied.

6. Finally, assuming evaluation of the license 16 results in a positive determination that the user's computing device 14 has the right based on the DRL 48 terms to render the corresponding digital content 12 in the manner sought, the license evaluator 36 informs the black box 30 that such black box 30 can render the corresponding digital content 12 according to the decryption key (KD). The black box 30 thereafter applies the decryption key (KD) to decrypt the digital content 12 from the package 12p (i.e., (KD(KD (CONTENT)) =(CONTENT)) (step 1017).

It is important to note that the above-specified series of steps represents an alternating or 'ping-ponging' between the license 16 and the digital content 12. Such ping-ponging ensures that the digital content 12 is tightly bound to the license 16, in that the validation and evaluation process can only occur if both the digital content 12 and license 16 are present in a properly issued and valid form. In addition, since the same decryption key (KD) is needed to get the content server 22 public key (PU-CS) from the license 16 and the digital content 12 from the package 12p in a decrypted form (and perhaps the license terms (DRL 48) from the license 16 in a decrypted form), such items are also tightly bound. Signature validation also ensures that the digital content 12 and the license 16 are in the same form as issued from the content server 22 and the license server 24, respectively. Accordingly, it is difficult if not impossible to decrypt the digital content 12 by bypassing the license server 24, and also difficult if not impossible to alter and then decrypt the digital content 12 or the license 16.

In one embodiment of the present invention, signature verification, and especially signature verification of the license 16, is alternately performed as follows. Rather than having a signature encrypted by the private key of the license server 16 (PR-LS), as is seen in FIG. 8, each license 16 has a signature encrypted by a private root key (PR-R) (not shown), where the black box 30 of each DRM system 32 includes a public root key (PU-R) (also not shown) corresponding to the private root key (PR-R). The private root key (PR-R) is known only to a root entity, and a license server 24 can only issue licenses 16 if such license server 24 has arranged with the root entity to issue licenses 16.

In particular, in such embodiment:

1. the license server 24 provides its public key (PU-LS) to the root entity;

2. the root entity returns the license server public key (PU-LS) to such license server 24 encrypted with the private root key (PR-R) (i.e., (CERT (PU-LS) S (PR-R))); and 3. the license server 24 then issues a license 16 with a signature encrypted with the license server private key (S (PR-LS)), and also attaches to the license the certificate from the root entity (CERT (PU-LS) S (PR-R)).

For a DRM system 18 to validate such issued license 16, then, the DRM system 18:

1. applies the public root key (PU-R) to the attached certificate (CERT (PU-LS) S (PR-R)) to obtain the license server public key (PU-LS); and 2. applies the obtained license server public key (PU-LS) to the signature of the license 16 (S (PR-LS)).

Importantly, it should be recognized that just as the root entity gave the license server 24 permission to issue licenses 16 by providing the certificate (CERT (PU-LS) S (PR-R)) to such license server 24, such license server 24 can provide a similar certificate to a second license server 24 (i.e., (CERT (PU-LS2) S (PR-LS1)), thereby allowing the second license server to also issue licenses 16. As should now be evident, a license 16 issued by the second license server would include a first certificate (CERT (PU-LS1) S (PR-R)) and a second certificate (CERT (PU-LS2) S (PR-LS1)). Likewise, such license 16 is validated by following the chain through the first and second certificates. Of course, additional links in the chain may be added and traversed.

One advantage of the aforementioned signature verification process is that the root entity may periodically change the private root key (PR-R), thereby likewise periodically requiring each license server 24 to obtain a new certificate (CERT (PU-LS) S (PR-R)). Importantly, as a requirement for obtaining such new certificate, each license server may be required to upgrade itself. As with the black box 30, if a license server 24 is relatively current, i.e., has been upgraded relatively recently, it is less likely that license server 24 has been successfully attacked. Accordingly, as a matter of trust, each license server 24 is preferably required to be upgraded periodically via an appropriate upgrade trigger mechanism such as the signature verification process. Of course, other upgrade mechanisms may be employed without departing from the spirit and scope of the present invention.

Of course, if the private root key (PR-R) is changed, then the public root key (PU-R) in each DRM system 18 must also be changed. Such change may for example take place during a normal black box 30 upgrade, or in fact may require that a black box 30 upgrade take place. Although a changed public root key (PU-R) may potentially interfere with signature validation for an older license 16 issued based on an older private root key (PR-R), such interference may be minimized by requiring that an upgraded black box 30 remember all old public root keys (PU-R). Alternatively, such interference may be minimized by requiring signature verification for a license 16 only once, for example the first time such license 16 is evaluated by the license evaluator 36 of a DRM system 18. In such case, state information on whether signature verification has taken place should be compiled, and such state information should be stored in the state store 40 of the DRM system 18.

Digital Rights License 48

In the present invention, the license evaluator 36 evaluates a Digital Rights License (DRL) 48 as the rights description or terms of a license 16 to determine if such DRL 48 allows rendering of a corresponding piece of digital content 12 in the manner sought. In one embodiment of the present invention, the DRL 48 may be written by a licensor (i.e., the content owner) in any DRL language.

As should be understood, there are a multitude of ways to specify a DRL 48. Accordingly, a high degree of flexibility must be allowed for in any DRL language. However, it is impractical to specify all aspects of a DRL 48 in a particular license language, and it is highly unlikely that the author of such a language can appreciate all possible licensing aspects that a particular digital licensor may desire. Moreover, a highly sophisticated license language may be unnecessary and even a hindrance for a licensor providing a relatively simple DRL 48. Nevertheless, a licensor should not be unnecessarily restricted in how to specify a DRL 48. At the same time, the license evaluator 36 should always be able to get answers from a DRL 48 regarding a number of specific license questions.

Figure 11:
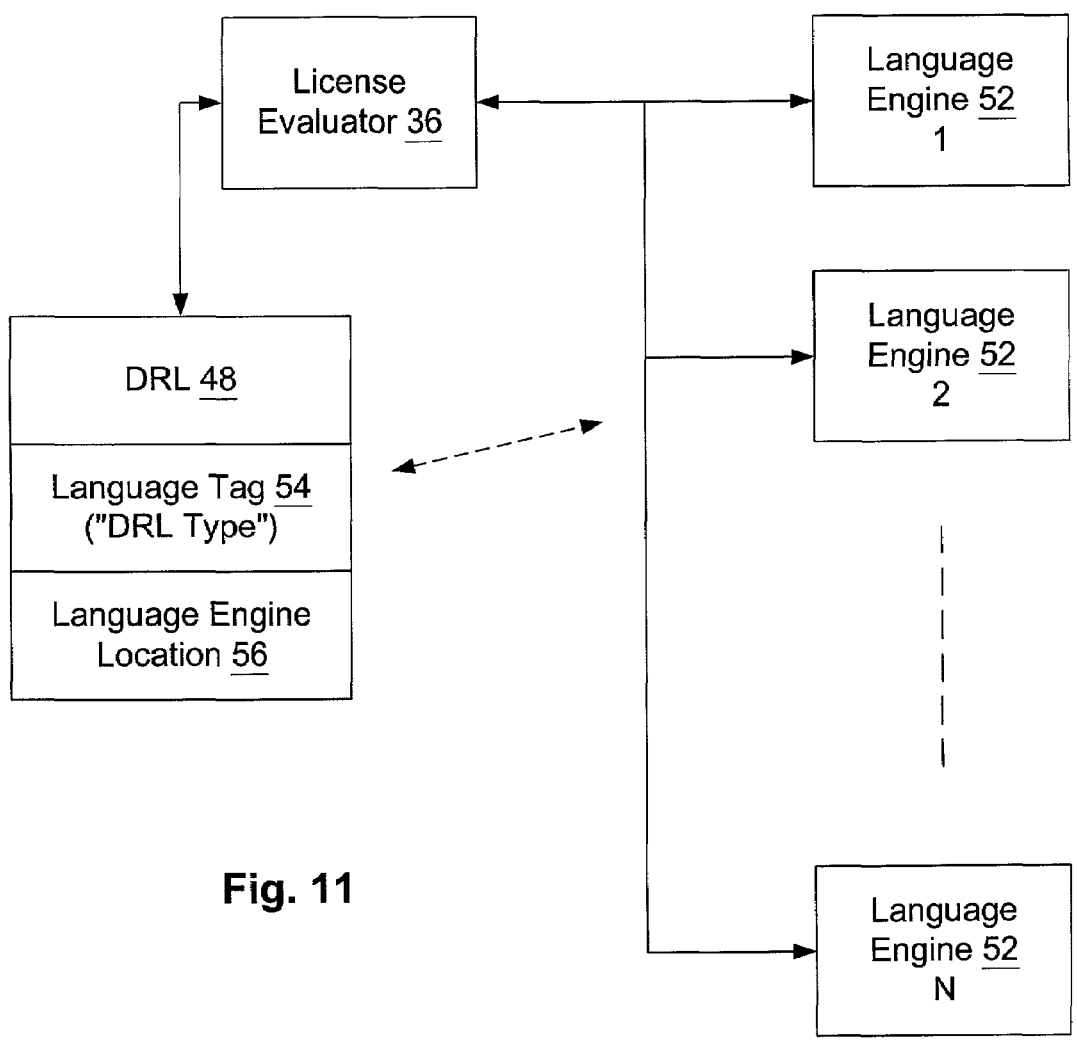
FIG. 11 is a block diagram showing the license evaluator of FIG. 4 along with a Digital Rights License (DRL) of a license and a language engine for interpreting the DRL in accordance with one embodiment of the present invention.

In the present invention, and referring now to FIG. 11, a DRL 48 can be specified in any license language, but includes a language identifier or tag 54. The license evaluator 36 evaluating the license 16, then, performs the preliminary step of reviewing the language tag 54 to identify such language, and then selects an appropriate license language engine 52 for accessing the license 16 in such identified language. As should be understood, such license language engine 52 must be present and accessible to the license evaluator 36. If not present, the language tag 54 and/or the DRL 48 preferably includes a location 56 (typically a web site) for obtaining such language engine 52.

Typically, the language engine 52 is in the form of an executable file or set of files that reside in a memory of the user's computing device 14, such as a hard drive. The language engine 52 assists the license evaluator 36 to directly interrogate the DRL 48, the license evaluator 36 interrogates the DRL 48 indirectly via the language engine 48 acting as an intermediary, or the like. When executed, the language engine 52 runs in a work space in a memory of the user's computing device 14, such as RAM. However, any other form of language engine 52 may be employed without departing from the spirit and scope of the present invention.

Preferably, any language engine 52 and any DRL language supports at least a number of specific license questions that the license evaluator 36 expects to be answered by any DRL 48, as will be discussed below. Accordingly, the license evaluator 36 is not tied to any particular DRL language; a DRL 48 may be written in any appropriate DRL language; and a DRL 48 specified in a new license language can be employed by an existing license evaluator 36 by having such license evaluator 36 obtain a corresponding new language engine 52.

DRL Languages

Two examples of DRL languages, as embodied in respective DRLs 48, are provided below. The first, 'simple' DRL 48 is written in a DRL language that specifies license attributes, while the second 'script' DRL 48 is written in a DRL language that can perform functions according to the script specified in the DRL 48. While written in a DRL language, the meaning of each line of code should be apparent based on the linguistics thereof and/or on the attribute description chart that follows:

```
Simple DRL 48:
<LICENSE>
<DATA>
<NAME>Beastie Boy's Play</NAME>
<ID>39384</ID>
<DESCRIPTION>Play the song 3 times</DESCRIPTION>
<TERMS></TERMS>
<VALIDITY>
<NOTBEFORE>19980102 23:20:14Z</NOTBEFORE>
<NOTAFTER>19980102 23:20:14Z</NOTAFTER>
</VALIDITY>
<ISSUEDDATE>19980102 23:20:14Z</ISSUEDDATE>
<LICENSORSITE>http://www.foo.com</LICENSORSITE>
<CONTENT>
<NAME>Beastie Boy's</NAME>
<ID>392</ID>
<KEYID>39292</KEYID>
<TYPE>MS Encrypted ASF 2.0</TTYPE>
</CONTENT>
<OWNER>
<ID>939KDKD393KD</ID>
<NAME>Universal</NAME>
<PUBLICKEY></PUBLICKEY>
</OWNER>
<LICENSEE>
<NAME>Arnold</NAME>
<ID>939KDKD393KD</ID>
<PUBLICKEY></PUBLICKEY>
</LICENSEE>
<PRINCIPAL TYPE==AND=>
<PRINCIPAL TYPE==OR=>
<PRINCIPAL>
<TYPE>x86Computer</TYPE>
<ID>3939292939d9e939</ID>
<NAME>Personal Computer</NAME>
```

-continued

```
<AUTHTYPE>Intel Authenticated Boot PC SHA-1 DSA512</AUTHTYPE>
<AUTHDATA>29293939</AUTHDATA>
</PRINCIPAL>
<PRINCIPAL>
<TYPE>Application</TYPE>
<ID>2939495939292</ID>
<NAME>Window=s Media Player</NAME>
<AUTHTYPE>Authenticode SHA-1</AUTHTYPE>
<AUTHDATA>93939</AUTHDATA>
</PRINCIPAL>
</PRINCIPAL>
<PRINCIPAL>
<TYPE>Person</TYPE>
<ID>39299482010</ID>
<NAME>Arnold Blinn</NAME>
<AUTHTYPE>Authenticate user</AUTHTYPE>
<AUTHDATA>\\redmond\arnoldb</AUTHDATA>
</PRINCIPAL>
</PRINCIPAL>
<DRLTYPE>Simple</DRLTYPE>[the language tag 54]
<DRLDATA>
<START>19980102 23:20:14Z</START>
<END>19980102 23:20:14Z</END>
<COUNT>3</COUNT>
<ACTION>PLAY</ACTION>
</DRLDATA>
<ENABLINGBITS>aaaabbbbccccdddd</ENABLINGBITS>
</DATA>
<SIGNATURE>
<SIGNERNAME>Universal</SIGNERNAME>
<SIGNERID>9382ABK3939DKD</SIGNERID>
<HASHALGORITHMID>MD5</HASHALGORITHMID>
<SIGNALGORITHMID>RSA 128</SIGNALGORITHMID>
<SIGNATURE>xxxyyyxxxyyyxxxyyy</SIGNATURE>
<SIGNERPUBLICKEY></SIGNERPUBLICKEY>
<CONTENTSIGNEDSIGNERPUBLICKEY></CONTENTSIGNEDSIGNERPUBLIC
    KEY>
</SIGNATURE>
</LICENSE>
Script DRL 48:
<LICENSE>
<DATA>
<NAME>Beastie Boy's Play</NAME>
<ID>39384</ID>
<DESCRIPTION>Play the song unlimited</DESCRIPTION>
<TERMS></TERMS>
<VALIDITY>
<NOTBEFORE>19980102 23:20:14Z</NOTBEFORE>
<NOTAFTER>19980102 23:20:14Z</NOTAFTER>
</VALIDITY>
<ISSUEDDATE>19980102 23:20:14Z</ISSUEDDATE>
<LICENSORSITE>http://www.foo.com</LICENSORSITE>
<CONTENT>
<NAME>Beastie Boy's</NAME
<ID>392</ID>
<KEYID>39292</KEYID>
<TYPE>MS Encrypted ASF 2.0</TTYPE>
</CONTENT>
<OWNER>
<ID>939KDKD393KD</ID>
<NAME>Universal</NAME>
<PUBLICKEY></PUBLICKEY>
</OWNER>
<LICENSEE>
<NAME>Arnold</NAME>
<ID>939KDKD393KD</ID>
<PUBLICKEY></PUBLICKEY>
</LICENSEE>
<DRLTYPE>Script</DRLTYPE>[the language tag 54]
<DRLDATA>
function on_enable(action, args) as boolean
result = False
if action = "PLAY" then
result = True
end if
on_action = False
end function
. . .
</DRLDATA>
```

```
</DATA>
<SIGNATURE>
<SIGNERNAME>Universal</SIGNERNAME>
<SIGNERID>9382</SIGNERID>
<SIGNERPUBLICKEY></SIGNERPUBLICKEY>
<HASHID>MD5</HASHID>
<SIGNID>RSA 128</SIGNID>
<SIGNATURE>xxxyyyxxxyyyxxxyyy</SIGNATURE>
<CONTENTSIGNEDSIGNERPUBLICKEY></CONTENTSIGNEDSIGNERPUBLIC
    KEY>
</SIGNATURE>
</LICENSE>
```

In the two DRLs 48 specified above, the attributes listed have the following descriptions and data types:

| Attribute | Description | Data Type |
|---|---|---|
| Id | ID of the license | GUID |
| Name | Name of the license | String |
| Content Id | ID of the content | GUID |
| Content Key Id | ID for the encryption key of the content | GUID |
| Content Name | Name of the content | String |
| Content Type | Type of the content | String |
| Owner Id | ID of the owner of the content | GUID |
| Owner Name | Name of the owner of the content | String |
| Owner Public Key | Public key for owner of content. This is a base-64 encoded public key for the owner of the content. | String |
| Licensee Id | Id of the person getting license. It may be null. | GUID |
| Licensee Name | Name of the person getting license. It may be null. | String |
| Licensee Public Key | Public key of the licensee. This is the base-64 encoded public key of the licensee. It may be null. | String |
| Description | Simple human readable description of the license | String |
| Terms | Legal terms of the license. This may be a pointer to a web page containing legal prose. | String |
| Validity Not After | Validity period of license expiration | Date |
| Validity Not Before | Validity period of license start | Date |
| Issued Date | Date the license was issued | Date |
| DRL Type | Type of the DRL. Example include ASIMPLE @ or ASCRIPT @ | String |
| DRL Data | Data specific to the DRL | String |
| Enabling Bits | These are the bits that enable access to the actual content. The interpretation of these bits is up to the application, but typically this will be the private key for decryption of the content. This data will be base-64 encoded. Note that these bits are encrypted using the public key of the individual machine. | String |
| Signer Id | ID of person signing license | GUID |
| Signer Name | Name of person signing license | String |
| Signer Public Key | Public key for person signing license. This is the base-64 encode public key for the signer. | String |
| Content Signed Signer Public Key | Public key for person signing the license that has been signed by the content server private key. The public key to verify this signature will be encrypted in the content. This is base-64 encoded. | String |
| Hash Alg Id | Algorithm used to generate hash. This is a string, such as AMD5 @. | String |
| Signature Alg Id | Algorithm used to generate signature. This is a string, such as ARSA 128 @. | String |
| Signature | Signature of the data. This is base-64 encoded data. | String |

Methods

As was discussed above, it is preferable that any language engine 52 and any DRL language support at least a number of specific license questions that the digital license evaluator 36 expects to be answered by any DRL 48. Recognizing such supported questions may include any questions without departing from the spirit and scope of the present invention, and consistent with the terminology employed in the two DRL 48 examples above, in one embodiment of the present invention, such supported questions or 'methods' include 'access methods', 'DRL methods', and 'enabling use methods', as follows:

Access Methods

Access methods are used to query a DRL 48 for top-level attributes.

VARIANT QueryAttribute (BSTR key)

Valid keys include License.Name, License.Id, Content.Name, Content.Id, Content.Type, Owner.Name, Owner.Id, Owner.PublicKey, Licensee.Name, Licensee.Id, Licensee.PublicKey, Description, and Terms, each returning a BSTR variant; and Issued, Validity.Start and Validity.End, each returning a Date Variant.

DRL Methods

The implementation of the following DRL methods varies from DRL 48 to DRL 48. Many of the DRL methods contain a variant parameter labeled 'data' which is intended for communicating more advanced information with a DRL 48. It is present largely for future expandability.

Boolean IsActivated(Variant data)

This method returns a Boolean indicating whether the DRL 48/license 16 is activated. An example of an activated license 16 is a limited operation license 16 that upon first play is active for only 48 hours.

Activate(Variant data)

This method is used to activate a license 16. Once a license 16 is activated, it cannot be deactivated.

Variant QueryDRL(Variant data)

This method is used to communicate with a more advanced DRL 48. It is largely about future expandability of the DRL 48 feature set.

Variant GetExpires(BSTR action, Variant data)

This method returns the expiration date of a license 16 with regard to the passed-in action. If the return value is NULL, the license 16 is assumed to never expire or does not yet have an expiration date because it hasn't been activated, or the like.

Variant GetCount(BSTR action, Variant data)

This method returns the number of operations of the passed-in action that are left. If NULL is returned, the operation can be performed an unlimited number of times.

Boolean IsEnabled(BSTR action, Variant data)

This method indicates whether the license 16 supports the requested action at the present time.

Boolean IsSunk(BSTR action, Variant data)

This method indicates whether the license 16 has been paid for. A license 16 that is paid for up front would return TRUE, while a license 16 that is not paid for up front, such as a license 16 that collects payments as it is used, would return FALSE.

Enabling Use Methods.

These methods are employed to enable a license 16 for use in decrypting content.

Boolean Validate (BSTR key)

This method is used to validate a license 16. The passed-in key is the black box 30 public key (PU-BB) encrypted by the decryption key (KD) for the corresponding digital content 12 (i.e.,(KD(PU-BB))) for use in validation of the signature of the license 16. A return value of TRUE indicates that the license 16 is valid. A return value of FALSE indicates invalid.

int OpenLicense 16(BSTR action, BSTR key, Variant data)

This method is used to get ready to access the decrypted enabling bits. The passed-in key is (KD(PU-BB)) as described above. A return value of 0 indicates success. Other return values can be defined.

BSTR GetDecryptedEnablingBits (BSTR action, Variant data)

Variant GetDecryptedEnablingBitsAsBinary (BSTR action, Variant Data)

These methods are used to access the enabling bits in decrypted form. If this is not successful for any of a number of reasons, a null string or null variant is returned. void CloseLicense 16 (BSTR action, Variant data)

This method is used to unlock access to the enabling bits for performing the passed-in action. If this is not successful for any of a number of reasons, a null string is returned.

Heuristics

As was discussed above, if multiple licenses 16 are present for the same piece of digital content 12, one of the licenses 16 must be chosen for further use. Using the above methods, the following heuristics could be implemented to make such choice. In particular, to perform an action (say APLAY@) on a piece of digital content 12, the following steps could be performed:

1. Get all licenses 16 that apply to the particular piece of digital content 12.

2. Eliminate each license 16 that does not enable the action by calling the IsEnabled function on such license 16.

3. Eliminate each license 16 that is not active by calling IsActivated on such license 16.

4. Eliminate each license 16 that is not paid for up front by calling IsSunk on such license 16.

5. If any license 16 is left, use it. Use an unlimited-number-of-plays license 16 before using a limited-number-of-plays license 16, especially if the unlimited-number-of-plays license 16 has an expiration date. At any time, the user should be allowed to select a specific license 16 that has already been acquired, even if the choice is not cost-effective. Accordingly, the user can select a license 16 based on criteria that are perhaps not apparent to the DRM system 32.

6. If there are no licenses 16 left, return status so indicating. The user would then be given the option of:

using a license 16 that is not paid for up front, if available;

activating a license 16, if available; and/or performing license acquisition from a license server 24.

Rendering Digital Content on a Portable Device or the Like

Figure 13:
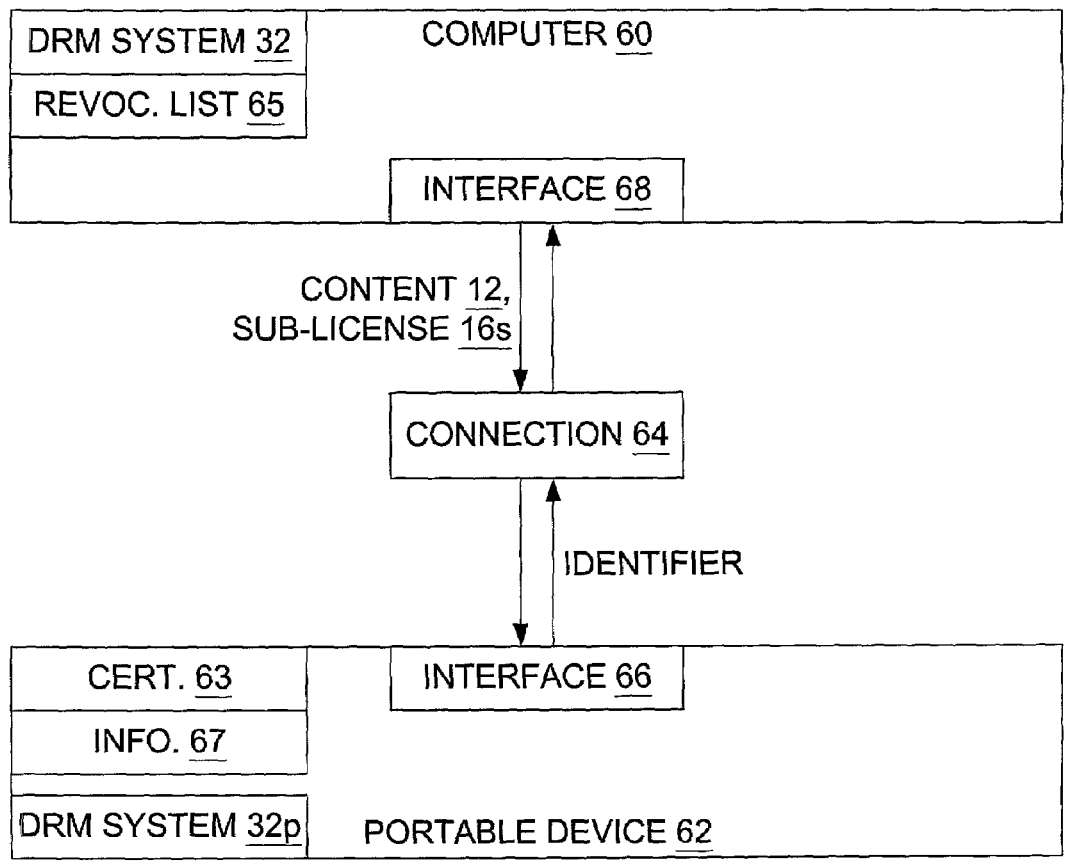
FIG. 13 is a block diagram representing an arrangement wherein a portable device couples to a computer for purposes of downloading content and a corresponding sub-license in accordance with one embodiment of the present invention.

Referring now to FIG. 13, it is to be appreciated that in one mode of obtaining and rendering digital content 12, such digital content 12 is downloaded or otherwise placed on a personal computer 60 or the like, and the corresponding digital license 16 once obtained is also is downloaded or otherwise placed on the personal computer 60 or the like. Typically, the personal computer 60 or the like is a relatively large and not easily movable device, and requires a power line connection for receiving externally supplied power, and a communications line connection for communicating with the world. In addition, and as was discussed in connection with FIG. 12, the computer 60 may include a cable-connected keyboard, a cable-connected mouse, a cable-connected screen, and the like, and may be coupled to a scanner, a printer, and/or other peripheral devices. Thus, the computer 60 is relatively tied down or 'tethered' by such connections and peripherals.

Of course, the personal computer 60 of FIG. 13 becomes un-tethered by, for example, disconnecting the peripherals, and becomes more un-tethered by embodying the computer 60 in the form of a full-function lap-top computer having the screen, keyboard, mouse, and a battery power supply built in. Nevertheless, a user wishing to render digital content 12 such as for example a musical selection while for example exercising would certainly balk at carrying such a lap-top computer 60 during such activity, even if such lap-top computer 60 weighs only four or five pounds. Moreover, even if such full-function lap-top computer 60 was made to be light-weight, perhaps on the order of two to four ounces, the computer 60 still would contain sensitive components (the hard drive, e.g.) that are likely to be damaged during such activity.

Fortunately, and again referring to FIG. 13, un-tethered, light-weight, truly portable computing devices 62 exist and can be employed to store and render at least some forms of digital content 12. For example, the DIAMOND RIO portable music player, marketed by S3 Incorporated of Santa Clara, Calif. is battery-operated, fits in a palm or pocket, has no moving parts, includes large amounts of onboard flash memory to hold digital content 12, and can render the digital content 12 if for example in the Windows Media Audio (WMA) or the MP3 formats. Such DIAMOND RIO player also is supplied with an appropriate cable and has an interface through which the digital content 12 may be downloaded from the computer 60 by way of the cable. Other portable music players include the RCA Lyra, Creative Nomad II, and Pocket PC devices from Hewlett-Packard, Casio and Compaq. However, and importantly, configuring portable computing devices 62 to support the DRM architecture as set forth above raises several issues.

One issue concerns certain players that have relatively small amounts of memory set aside for player operations such as decrypting content, rendering content, and the like. As may be appreciated, with a relatively small amount of memory, a portable device 62 cannot perform at least some DRM functions as were discussed above, such as for example public-private key decryption. A solution responsive to such issue is set forth in U.S. patent application No. 09/645,887, entitled "Binding Digital Content to a Portable Storage Device Or the Like In A Digital Rights Management (DRM) System" and filed Aug. 25, 2000, hereby incorporated by reference herein in its entirety.

However, and importantly, the solution set forth in such U.S. patent application relies on a key system based on a global secret, and such key system is therefore likely globally compromised if and when the global secret is discovered and disseminated. Accordingly, in one embodiment of the present invention, the portable device 62 performs public-private key decryption by way of a portable DRM system 32*p*(FIG. 13) instantiated in a memory thereon. As may be appreciated, such DRM system 32*p* and the accompanying operations such as decrypting content, rendering content, and the like are accommodated on the portable device 62 by increasing the amount of memory on such portable device 62 available, reducing the size of the DRM system 32*p* as instantiated in the memory, or both.

In one embodiment of the present invention, and as with the subject matter disclosed in the aforementioned U.S. patent application Ser. No. 09/645,887, all obtaining of digital content 12 and corresponding digital licenses 16 for the portable device 62 is performed by way of a computer 60 or the like. In particular, the computer 60 obtains a license 16 for corresponding digital content 16 and then issues a sub-license 16*s* to the portable device 62 for rendering the digital content 12 on the portable device 62. Such sub-license 16*s* may be issued in the course of downloading the digital content 12 from the computer 60 to the portable device 62, or may be issued at a time before or after downloading the digital content 12 from the computer 60 to the portable device 62, or at another time, all without departing from the spirit and scope of the present invention. Note that although the present invention is discussed in terms of a computer 60 and a portable device 62, as seen in FIG. 13, it will be appreciated that the present invention may be implemented with regard to any particular type of computing device 14 other than the computer 60, as appropriate, without departing from the spirit and scope of the present invention.

Importantly, since the computer 60 performs the bulk of the license acquisition and content acquisition functionality for the portable device 62, such portable device 62 and the DRM system 32*p* therein need not include such functionality therein, except insofar as is necessary to download the content 12 and the sub-license 16*s*. Accordingly, significant license acquisition and content acquisition portions of the DRM system 32 as resident on the computer 60 may be omitted from the DRM system 32*p* as resident on the portable device 62.

The portable device 62 may be defined as a generally closed device in that data can be on-loaded and off-loaded only in a limited manner, user access to hardware within the portable device 62 is very limited, and input and display functionality is limited to a few function keys and perhaps a small LCD screen, respectively. Thus, a content thief can do very little in the way of examining either the memory or physical contents of the portable device 62 to obtain content 12 therein in an unencrypted form or decryption keys. In contrast, the computer 60 may be defined as a generally open device in that data can be on-loaded and off-loaded in a wide-ranging manner by any of a broad range of hardware and/or software, user access to hardware within the portable device 62 is not limited in any significant way, and input and display functionality is available by way of a full-function keyboard, a mouse, a high-resolution monitor, and the like. Thus, a content thief has many potential opportunities available to examine the memory and physical contents of the computer 60 to obtain content 12 therein in an unencrypted form or decryption keys. In sum, then, the portable device 62 as a closed device is less susceptible to nefarious actions committed by a content thief, especially as compared to the computer 60 as an open device.

As a result, and also importantly, the portable device 62 and the DRM system 32*p* therein need not include functionality therein necessary to guard against most types of content theft and decryption key theft, except insofar as is necessary during download of the content 12 and the sub-license 16*s*. Accordingly, significant theft prevention portions of the DRM system 32 as resident on the computer 60 may be omitted from the DRM system 32*p* as resident on the portable device 62.

To sum up, then, the DRM system 32*p* as resident on the portable device 62 need only include functionality necessary (1) to authenticate the portable device 62 to the computer 60 during downloading of a sub-license 16*s* to the portable device, and to facilitate such downloading, and (2) to render content 12 on the portable device 62 according to downloaded and resident sub-license(s) 16*s*, including ensuring that requirements in a sub-license 16*s* are filled and obtaining the content key (KD) from the sub-license 16*s*. All other functionality as available in the DRM system 32 on the computer 60 is either unnecessary in the DRM system 32*p* on the portable device 62, or is inherent in the portable device 62 being a closed device.

As may be appreciated, and as was disclosed in the aforementioned U.S. patent application Ser. No. 09/645,887, the sub-license 16*s* as issued by the computer 60 specifies the limitations, if any, that must be satisfied to render the corresponding content 12 on the portable device 62. Of course, the computer 60 may issue such sub-license 16*s* only if permitted according to the terms of the corresponding license 16 as obtained by the computer 60 from an appropriate license server 24. As was also disclosed in the aforementioned U.S. patent application No. 09/645,887, the computer 60 re-writes at least a portion of the license 16 when issuing the sub-license 16*s* to be in a form that is more amenable to the portable device 62 and that ties or binds the sub-license 16*s* to the portable device 62. In particular, the computer 60 re-encrypts the content key (KD) for decrypting the content 12 into a form that is more amenable to decryption by the portable device 62. Here, though, the content key is re-encrypted according to the black box public key of the DRM system 32p of the portable device 62 (PU-BB-PD).

In particular, and assuming that the content key (KD) in the license 16 on the computer 60 is encrypted according to an asymmetric key such as the black box public key of the computer 60 (PU-BB-CO) in the manner discussed above, the computer 60 obtains the content key (KD) by applying the black box private key of the computer 60 (PR-BB-CO) in the manner discussed above, then re-encrypts the content key (KD) according to (PU-BB-PD). Thus, and as should be appreciated, the content key (KD) is obtainable by the portable device 62 at the appropriate time by application of the black box private key of the portable device 62 (PR-BB-PD), and the sub-license 16s is therefore tied or bound to the portable device 62. As should be appreciated, without re-encrypting the content key (KD), the portable device 62, which would not know (PR-BB-CO), would not be able to decrypt (PU-BB-CO (KD)) to obtain (KD).

Delivering the Content 12 and the Sub-license 16S to the Portable Device 62

Figure 15:
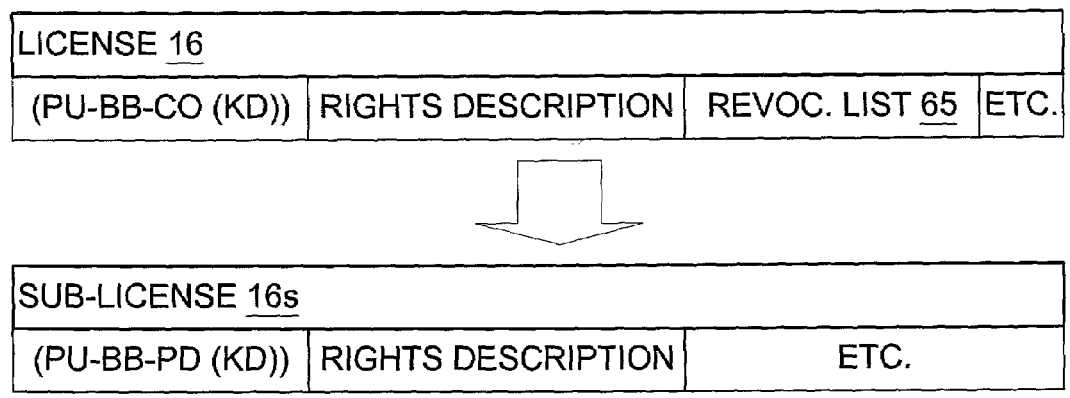
FIG. 15 is a block diagram showing a license and a sub-license derived from the license in the manner shown in FIG. 14 in accordance with one embodiment of the present invention.
Figure 14:
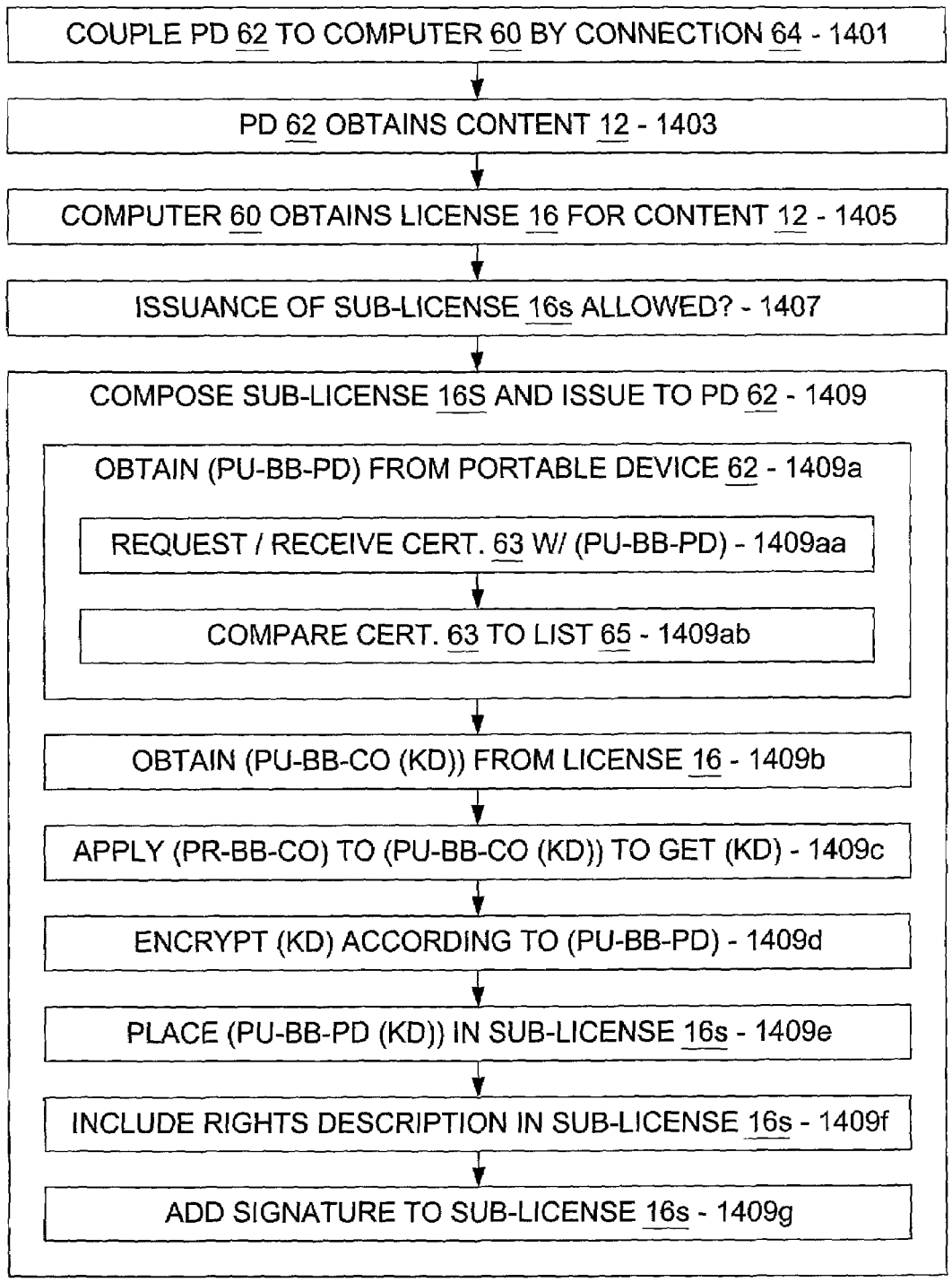
FIGS. 14 and 14A are flow diagrams showing steps performed in delivering digital content and a sub-license from the computer to the portable device of FIG. 13 in accordance with one embodiment of the present invention.

Referring now to FIGS. 14 and 15, then, in one embodiment of the present invention, digital content 12 and a corresponding sub-license 16s are downloaded to a portable device 62 according to the following steps. Preliminarily, the portable device 62 must be coupled to an appropriate computer 60 by way of an appropriate connection 64 in the manner shown in FIG. 13 (step 1401). The connection 64 may be any appropriate connection without departing from the spirit and scope of the present invention. Typically, though, the portable device 62 has one or more interfaces 66 and such interface(s) 66 dictate the types of connections 64 that may be employed. For example, the interface 66 may be a serial port, a parallel port, a USB port, a 'fire wire' port, an infrared port, or the like, in which case a corresponding type of connection 64 must be employed, assuming the computer 60 supports such connection 64 by way of a corresponding interface 68 and appropriate supporting hardware and/or software. Such connections 64, interfaces 66, 68, and hardware and/or software in support thereof are known or should be apparent to members of the relevant public and therefore need not be described herein in any further detail.

Prior to or after coupling the computer 60 and the computing device 62, the portable device 62 must obtain the content 12 (step 1403). Note that the content 12 may be placed on the portable device 62 directly from an external source, such as by way of an appropriate transferable storage media such as magnetic media, optical media, or electronic media. For example, the storage media may be a micro-size magnetic disk or a 'memory stick' with the content 12 already placed thereon by the portable device 62 or another device. Typically, though, and especially in the case where the storage media of the portable device is not transferable, the content 12 is placed thereon by first being placed on the computer 60 and then being transferred from the computer 60 to the portable device 62 by way of the connection 64. Note that such placement on the computer 60 may be very brief, especially if the computer 60 is obtaining the content 12 directly for the portable device 62. Obtaining the content 12 and placing such content 12 on the portable device 62, either by way of the computer 60 or otherwise, is known or should be apparent to members of the relevant public and therefore need not be described herein in any further detail.

Also prior to or after coupling the computer 60 and the portable device 62, the computer 60 must obtain a corresponding license 16 for the content 12 from an appropriate source in the manner set forth above (step 1405). Note that the license 16 need not necessarily allow rendering of the corresponding content 12 on the computer 60. However, such license 16 must allow or at least not prohibit issuance of a corresponding sub-license 16s for the portable device 62 and also rendering of the content 12 on the portable device 62. That is, a licensor may decide for any of a variety of reasons not to allow rendering of its content 12 on a portable device 62, and therefore prohibit by the terms of a corresponding license 16 issuance of a corresponding sub-license 16s for such portable device 62. Likewise, such licensor may allow issuance of the corresponding sub-license 16s, but only for certain portable devices 62. Such licensor may for example specify such sub-license issuance rules in the license 16 to specify the rules of the derived license.

Thus, the computer 60 checks the obtained license 16 to determine whether the license 16 in fact allows and does not prohibit issuance of the sub-license 16s, and perhaps whether the license 16 in fact allows and does not prohibit issuance of the sub-license 16s for the portable device 62 (step 1407). Such a check of course requires that the portable device 62 communicates identifying information to the computer 60, and may take any appropriate form without departing from the spirit and scope of the present invention. Assuming the check determines that the sub-license 16s may in fact be issued, such issuance proceeds.

As seen in FIG. 15, the computer 60 thus composes and issues a sub-license 16s to the portable device 62 based on the obtained license 16, wherein the DRM system 32p on the portable device 62 renders the corresponding content 12 only in accordance with the terms of the sub-license 16s (step 1409). In composing and issuing such sub-license 16s, and as was discussed above, the computer 60 re-encrypts the content key (KD) for decrypting the content 12 from (PU-BB-CO (KD)) to (PU-BB-PD (KD)).

In particular, it is to be remembered that according to the DRM architecture, a piece of digital content 12 is encrypted according to a symmetric content key (KD), that the content 12 is to be rendered on a computing device 14 having a black box 30, that the black box 30 has associated asymmetric public and private keys (PU-BB, PR-BB), that a corresponding license 16 for the content 12 contains the content key (KD) encrypted according to (PU-BB), and therefore that the license 16 is tied or bound to the black box of the computing device 14 and the computing device 14 itself. In issuing a sub-license 16s to the portable device 62 for the corresponding content 12, then, the computer 60 must tie or bind the sub-license 16s to the portable device 62 by re-encrypting the content key (KD) therein according to (PU-BB-PD).

Thus, the computer 60 performs such re-encryption by:

1. obtaining (PU-BB-PD) from the portable device 62 (step 1409a)

2. obtaining the content key (KD) encrypted according to (PU-BB-CO) (i.e., (PU-BB-CO (KD)) from the license 16 (step 1409b);

3. applying (PR-BB-CO) to (PU-BB-CO (KD)) to obtain (KD) (step 1409c); and 4. encrypting (KD) according to (PU-BB-PD) (step 1409d).

Such (PU-BB-PD(KD)) is then placed in the sub-license 16s by the computer 60 (step 1409e).

It is to be appreciated that in some instances, KD is indirectly encrypted according to PU-BB, by way of an intermediate key. That is, PU-BB encrypts the intermediate key and the intermediate key encrypts KD. Note, though, that KD is still in the original license 16. More generally, then, and as should be appreciated, the computer 60 performs re-encryption by obtaining the content key (KD) from the license 16 and unsealing same, and then re-sealing KD within the sub-license 16s.

In one embodiment of the present invention, and referring again to FIG. 13, the portable device 62 includes a certificate 63 within which is (PU-BB-PD). Thus, and as may now be appreciated, the computer 60 obtains (PU-BB-PD) from the portable device 62 (step 1409a) by requesting that the portable device 62 transmit the certificate 63 with such (PU-BB-PD) to the computer 60 and in fact receiving such certificate 63 (step 1409aa). The certificate 63 may be signed based on (PR-BB-PD) to verify that the certificate 63 has not been tampered with. The certificate 63 as received by the computer 60 may be compared as against a revocation list 65 to ensure that the certificate 63 has not been compromised (step 1409ab). The revocation list 65 may be in the license 16 (FIG. 15), the computer 60 (FIG. 13), or elsewhere.

In one embodiment of the present invention, the certificate 63 from the portable device 62 also contains information 67 relating to the portable device 62. Such information 67 may be any appropriate information without departing from the spirit and scope of the present invention. In one embodiment, such information 67 relates to information that may be employed to determine whether the license 16 allows issuance of the sub-license 16s (step 1407). For example, the information 67 could include the name, type, and manufacturer of the portable device 62, the version of the black box 30 on the DRM system 32p of the portable device 62, and the like. As may be appreciated, providing such information 67 to the computer 60 in the form of the certificate 63 provides the license 16 with the ability to specify a wide range of requirements to determine whether to issue the sub-license 16s to the portable device 62 based on properties of the portable device 62 itself.

Figure 14A:
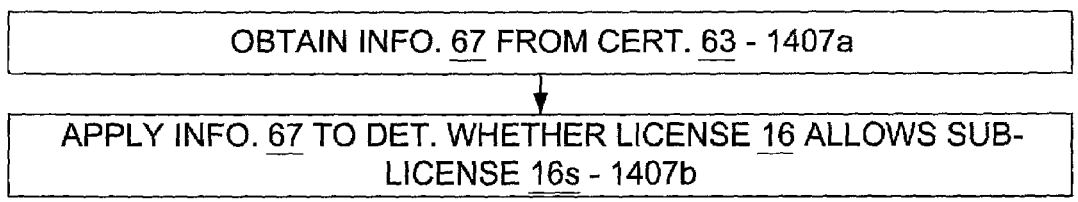

If the information 67 is in fact employed to determine whether the license 16 allows issuance of the sub-license 16s, the certificate 63 must be received (step 1409aa) prior to step 1407. Correspondingly, if the information 67 is in fact employed to determine whether the license 16 allows issuance of the sub-license 16s, step 1407 includes obtaining the information 67 from the certificate 63 (step 1407a) and applying the information 67 to the determination of whether the license 16 allows issuance of the sub-license 16s (step 1407b) (FIG. 14A). As may be appreciated, such determination based on such information 67 may be any desired determination. For example, the determination may include a consideration of whether the manufacturer and/or type of portable device 62 is acceptable, and/or whether the black box 30 on the DRM system 32p of the portable device 62 is acceptable, among other things.

In composing and issuing the sub-license 16s, then, the computer 60 generates the sub-license 16s from the license 16 by re-writing the license 16 to substitute (PU-BB-PD (KD)) for (PU-BB-CO (KD)), as is seen in FIG. 15. In generating the sub-license 16s, the computer 60 also includes a rights description in the sub-license 16s (step 1409f, FIG. 14). Such rights description is essentially the rights description set forth within the license 16 (e.g., DRL 48 of FIG. 8). Note that the computer 60 may alter such rights description if necessary or advisable, although no particular rights description alterations are required, generally. Alternatively, the licensor may specify the rights description for the sub-license 16s in the license 16, where the rights description for the sub-license 16s is substantially different from and/or separate from the rights description for the license 16.

Once substantively generated, the sub-license 16s may be finished by adding a signature to verify the contents of the sub-license 16s (step 1409g). As may be appreciated, such signature is based on at least a portion of the information in the sub-license 16s. Accordingly, alteration of such information will cause the signature to fail to verify. The signature may also be based on (PU-BB-PD).

As may be appreciated, the steps of FIG. 14 as discussed above may substantially be performed by a function or set of functions written for and accessible by the DRM system 32 on the computer 60. Accordingly, such function or functions are actuated upon a user attempting to download content 12 and/or a sub-license 16s from the computer 60 to the portable device 62.

Rendering the Content 12 on the Portable Device 62 According to the Sub-license 16S

Figure 16:
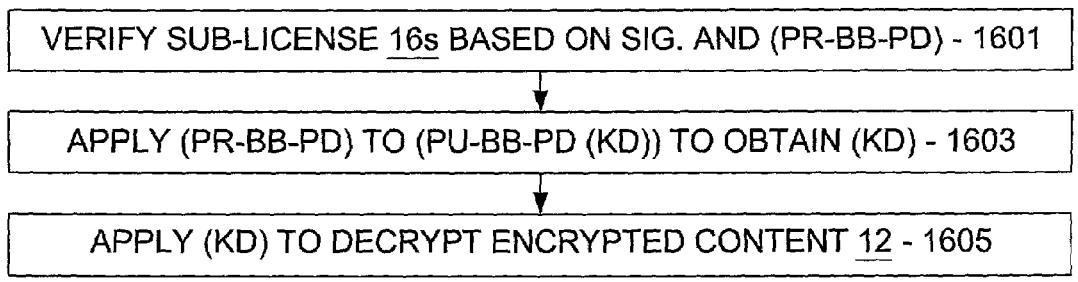
FIG. 16 is a flow diagram showing steps performed by the portable device of FIG. 13 in rendering content based on a sub-license in accordance with one embodiment of the present invention.

Referring now to FIG. 16, once the portable device 62 has the content 12 and the sub-license 16s, such portable device 62, if allowed by the rights description in the sub-license 16s, may render the content 12 by:

1. verifying the contents of the sub-license 16s based on the signature thereof and (PR-BB-PD) (step 1601);
2. applying (PR-BB-PD) to (PU-BB-PD (KD)) to obtain the content key (KD) (step 1603); and
3. applying (KD) to decrypt the encrypted content 12 (step 1605).

Checking Out And Checking In Sub-Licenses 16S

As heretofore described, a computer 60 may issue an essentially unlimited number of sub-licenses 16s to multiple portable devices 62. Note that an arrangement may be made wherein the number of sub-licenses 16s issued for a license 16 is stored as state information in the state store 40 (FIG. 4) on the computer 60, and therefore the DRM system 32 on the computer 60 may keep track of and limit the number of issued sub-licenses 16s corresponding to a license 16 according to the terms of such license 16. Further, such arrangement may be a check-in/check-out arrangement, wherein the stored number increases as sub-licenses 16s are 'checked out' to portable devices 62 and decreases as sub-licenses are 'checked in' from portable devices 62, and wherein the number has a maximum value as set according to the terms of the corresponding license 16.

As may be appreciated, checking in a sub-license 16s comprises removing the sub-license 16s from the portable device 62, and may be accomplished in any appropriate manner without departing from the spirit and scope of the present invention. For example, such checking in may comprise transferring the sub-license 16s from the portable device 62 to the computer 60, deleting the sub-license 16s from the portable device 62, or the like. Such checking in is known or should be apparent to the relevant public and therefore the mechanics thereof need not be discussed herein in any detail.

Notably, such a check-in/check-out arrangement can be subverted by copying a checked-out sub-license 16s (if possible) from the portable device 62 to a storage device (not shown), checking in the sub-license 16s from the portable device 62 to the computer 60, and re-copying the copied sub-license 16s from the storage device (not shown) back to the portable device 62. In such a situation, the sub-license 16s is checked in and yet still available on the portable device 62.

The aforementioned subversion may be avoided by an arrangement wherein information on each sub-license 16s checked-out to a portable device 62 is stored as state information in the state store 40 of such portable device 62. The DRM system 32 on the portable device 62 thus may keep track of each sub-license 16s legitimately thereon, and refuse to employ a sub-license 16s not noted in the state store 40 thereof and presumably already checked in to the computer 60. However, such arrangement may overly complicate the DRM system 32p on the portable device 62, and may cause synchronization problems in instances where check-in or check-out transactions are interrupted, for example.

In one embodiment of the present invention, such issues are avoided by the use of an arbitrary challenge value or 'nonce' during check-out and check-in, where the nonce is to be returned along with another element to signify that the element is legitimate. Any arbitrary nonce may be generated and employed in any appropriate manner without departing from the spirit and scope of the present invention. In particular, and referring now to FIG. 17, in the embodiment, check-out of a sub-license 16s from the (DRM system 32 of the) computer 60 to the (DRM system 32p of the) portable device 62 is achieved by:

1. requesting, by the computer 60, a nonce from the portable device 62, and receiving such nonce (step 1701);

2. sending, by the computer 60, the checked-out sub-license 16s and the received nonce to the portable device 62 (step 1703);

3. concluding, by the portable device 62, that the nonce sent by the computer 60 at step 1703 is the same nonce received by the computer 60 at step 1701 (step 1705); and 4. therefore concluding, by the portable device 62, that the sent sub-license 16s that accompanied the sent nonce is legitimate and not from a copied source or elsewhere (step 1707).

Of course, if the nonces do not match, or if no nonce accompanies a sent sub-license 16s, the portable device 62 concludes that the sent sub-license 16s is not legitimate, and may refuse to store such sent sub-license in the license store 38 of the DRM system 32p on the portable device 62. Thus, the nonce acts as a validating or trust-imparting device for the sent sub-license 16s.

Note that the nonce should be bound to the sub-license 16s. Otherwise, an attacker who intercepts this message could mix and match nonces and licenses. One binding method may be to include the nonce in the signed part of the sub license.

As part of checking out a sub-license 16s, and as will be necessary to check in the checked-out sub-license 16s, the checked-out sub-license 16s is added to a catalog 70 accessible by the DRM system 32 (step 1709). Such catalog 70 may for example be stored in the state store 40. Preferably, and as seen in FIG. 13, the catalog 70 includes for each sub-license 16s thereon an entry including an identifier identifying the checked-out sub-license 16s and an identifier identifying the portable device 62 to which the sub-license 16s is checked out.

Check-in, then, is achieved by deleting or otherwise removing the checked-out sub-license 16s from the portable device 62 and then providing a trusted indication to the computer 60 that the checked-out sub-license 16s has in fact been deleted. In particular, check-in of a sub-license 16s from the (DRM system 32p of the) portable device 62 to the (DRM system 32 of the) computer 60 is achieved by:

5. deleting, by the portable device 62, the checked-out sub-license 16s therefrom, either by user request or otherwise (step 1711);

6. requesting, by the portable device 62, a nonce from the computer 60, and receiving such nonce (step 1713);

7. sending, by the portable device 60 to the computer 60, the received nonce, an identifier identifying the portable device 62, and a list of all sub-licenses 16s currently resident on the portable device 62, wherein the deleted checked-out sub-license 16s is not in the sent list (step 1715);

8. concluding, by the computer 60, that the nonce sent by the portable device 62 at step 1715 is the same nonce received by the portable device 62 at step 1713 (step 1717);

9. therefore concluding, by the computer 60, that the sent identifier and list that accompanied the sent nonce is legitimate and not from another source (step 1719);

10. comparing, by the computer 60, the sent list with the catalog 70, and noting that the deleted checked-out sub-license 16s is in the catalog 70 but not on the sent list (step 1721); and 11. deleting the entry having the identifier identifying the deleted checked-out sub-license 16s and the identifier identifying the portable device 62 from the catalog 70 (step 1723).

Thus, the catalog 70 in the state store 40 acts as a library of all checked-out sub-licenses 16s for all portable devices 62 that check out sub-licenses 16s from the computer 60, and the presence of an entry that identifies a checked-out sub-license 16s acts as a 'count' for purposes of counting the number of sub-licenses 16s checked out from a particular license 16. Accordingly, such counting comprises searching the catalog 70 for the number of such checked-out sub-licenses 16s.

As with checking out a license, if in the course of checking in a license the nonces do not match, or if no nonce accompanies a sent list and identifier, the computer 60 concludes that the sent list and identifier are not legitimate, and may refuse to check in sub-licenses 16s based on the sent list and identifier. Thus, and again, the nonce acts as a validating or trust-imparting device for the sent list and identifier.

Figure 17:
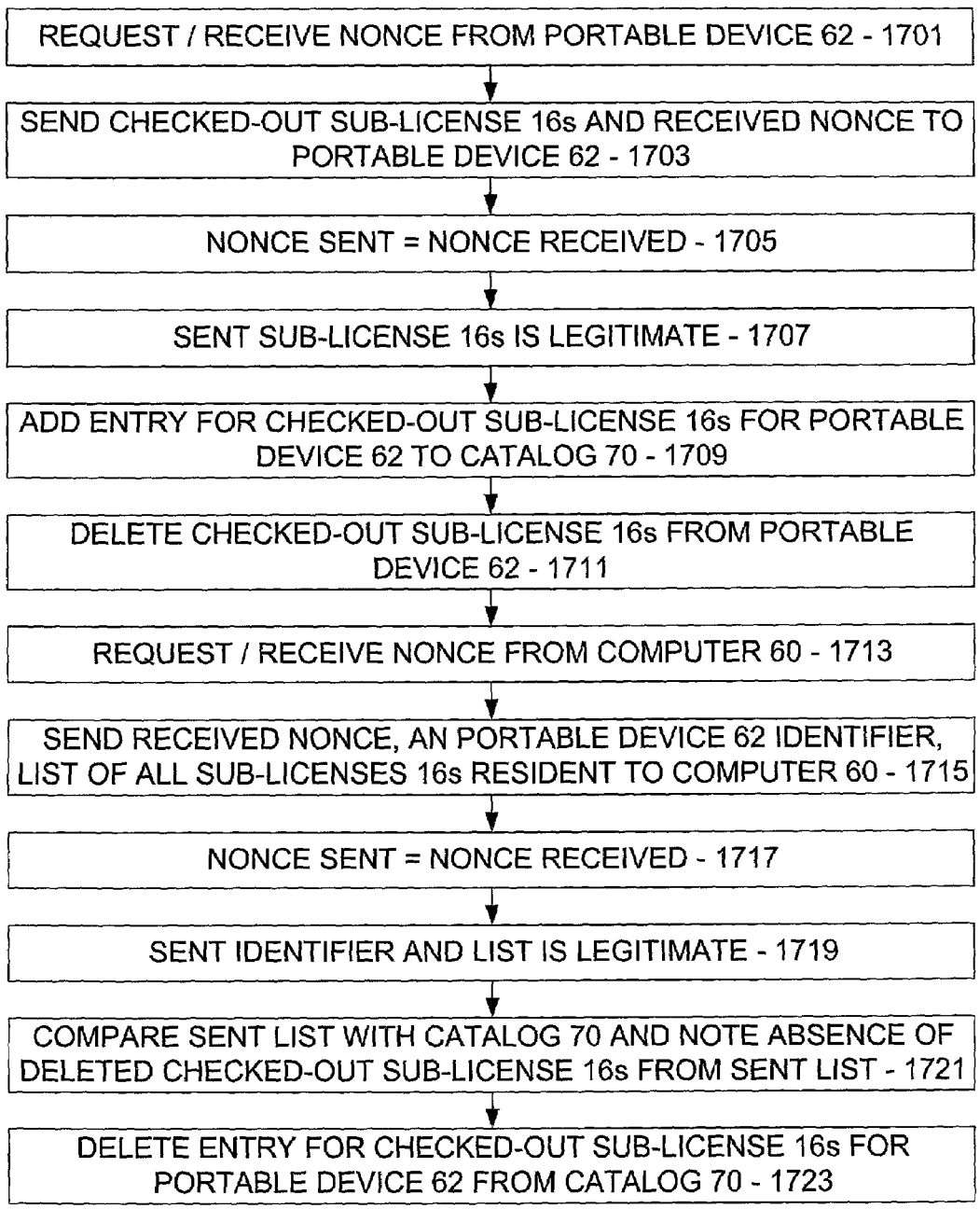
FIG. 17 is a flow diagram showing steps performed by the computer and the portable device of FIG. 13 to check out and check in a sub-license in accordance with one embodiment of the present invention.

In the mechanism set out in FIG. 17, checking in is not achieved by sending back a sub-license 16s from the portable device 62 to the computer 60. Rather, the sub-license 16s is deleted from the portable device 62 and the computer 60 is notified of such deletion in a trusted manner by way of the sent list. As may be appreciated, with such mechanism, the DRM system 32p on the portable device 62 need not maintain any particular state information on what sub-licenses 16s have been checked-out thereto. Also, by using the catalog 70, the computer 60 need not maintain count information for each sub-license 16s checked out based on each license 16.

CONCLUSION

The programming necessary to effectuate the processes performed and modules instantiated in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful enforcement architecture 10 that allows the controlled rendering or playing of arbitrary forms of digital content 12, where such control is flexible and definable by the content owner of such digital content 12. Also, the present invention comprises a new useful controlled rendering environment that renders digital content 12 only as specified by the content owner, even though the digital content 12 is to be rendered on a computing device 14 such as a portable device 62 which is not under the control of the content owner. Further, the present invention comprises a trusted component that enforces the rights of the content owner on such computing device 14 in connection with a piece of digital content 12, even against attempts by the user of such computing device 14 to access such digital content 12 in ways not permitted by the content owner.

It should be appreciated that changes could be made to the embodiments described above without departing from the inventive concepts thereof. In particular, although the present invention has heretofore been described in terms of a portable device 62 attached directly to a PC or computer 60, where the computer 60 has a license 16 and the license 16 is the basis for a sub-license 16s sent to the portable device 62, the present invention is more broadly defined.

For example, the portable device 62 does not in fact have to be portable and may in fact be tethered or too heavy to be moved around. Thus, the device 62 could be another computer or PC while still being within the spirit and scope of the present invention. Moreover, the computer 60 that is the conduit to the 'portable device' 62 need not necessarily be a PC, but can also be another portable device, or even types of computing devices such as set-top boxes, video consoles, game-playing stations, telephones, appliances, personal digital assistants, and the like. Broadly stated, in the present invention, the sub-license 16s may be prepared by any device for any other device and delivered to such other device using the mechanisms described herein.

In addition, the device 62 does not have to be connected directly to the computer 60 and may in fact be indirectly connected by way of a network such as a wired or wireless LAN or WAN (e.g., the Internet). Thus, the computer 60 may be any computer on such network or one of several computers on such network. By extension, if the device 62 can receive a sub-license 62 from an arbitrary computer on the network, such device can obtain such sub-license 16s directly from a license server 24. In this case, and as should be appreciated, the sub-license 16s is not re-written but is generated directly by the license server 24.

Moreover, although heretofore discussed in terms of a portable device 62, the sub-license 16s may be written directly for portable media that is mounted to such device 62 and that is transferable to other devices 62 and other devices in general. Of course, some alterations are required. Importantly, the portable device identifier is now a portable media identifier, and the sub-license 16s is written to be independent of the device 62.

Further, it is to be appreciated that in some instances the sub-license 16s is not written or downloaded. Instead, the sub-license 16s is implicit (e.g., all content is treated in a particular manner, license-wise), a number of license types are defined on the portable device 62 and each piece of content 12 identifies a license type, or the like.

It should be understood, therefore, that the present invention is not limited to the particular embodiments disclosed, but it is intended to cover modifications within the spirit and scope of the present invention as defined by the appended claims.

The invention claimed is:

1. A method for a user at a second computing device to render encrypted digital content on a first computing device distinct from the second device, the first device having a public key (PU1) and a corresponding private key (PR1), the second device having a public key (PU2) and a corresponding private key (PR2), the digital content being encrypted according to a content key (KD), the method comprising:

the user at the second device obtaining from a licensor distinct from the second device a digital license corresponding to the content and the second device the digital license including the content key (KD) therein encrypted according to the public key (PU2) of the second device (PU2 (KD)), and also including rules for determining whether the license permits issuance of a sub-license from the second device to the first device;

the user at the second device determining that the rules of the license do in fact permit issuance of a sub-license from the second device to the first device;

the user at the second device decrypting (PU2 (KD)) from the digital license with the corresponding private key (PR2) to produce the content key (KD);

the user at the second device obtaining from the first device the public key thereof (PU1);

the user at the second device encrypting the content key (KD) according to the public key (PU1) of the first device (PU1 (KD)); and the user at the second device composing the sub-license corresponding to and based on the obtained license for the first device, the sub-license including (PU1 (KD)), and transferring the composed sub-license to the first device, wherein the first device can decrypt (PU1 (KD)) with the private key thereof (PR1) to produce the content key (KD), and can render the encrypted content on the first device with the produced content key (KD).

2. The method of claim 1 further comprising, prior to composing the sub-license and transferring the composed sub-license to the device, checking the obtained license to determine that such license permits issuance of the sub-license to the device.

3. The method of claim 1 further comprising transferring the content to the first device.

4. The method of claim 1 for rendering encrypted digital content on a first device having a digital rights management (DRM) system, the DRM system having the public key (PU1) and the corresponding private key (PR1), the method comprising:

obtaining from the first device the public key of the DRM system thereof (PU1);

encrypting the content key (KD) according to the public key (PU1) of the DRM system of the first device (PU1 (KD)); and composing a sub-license corresponding to and based on the obtained license, the sub-license including (PU1 (KD)), and transferring the composed sub-license to the first device, wherein the DRIVI system of the first device can decrypt (PU1 (KD)) with the private key thereof (PR1) to produce the content key (KD), and can render the encrypted content on the first device with the produced content key (KD).

5. The method of claim 1 comprising:

obtaining the digital license and storing the obtained digital license on a second device;

decrypting the encrypted content key (KD) from the digital license on the second device to produce the content key (KD);

obtaining from the first device the public key thereof (PU1);

encrypting the content key (KD) according to the public key (PU1) of the first device (PU1 (KD)); and composing a sub-license corresponding to and based on the obtained license, the sub-license including (PU1 (KD)), and transferring the composed sub-license from the second device to the first device, wherein the first device can decrypt (PU1 (KD)) with the private key thereof (PR1) to produce the content key (KD), and can render the encrypted content on the first device with the produced content key (KD).

6. The method of claim 5 wherein the second device has a public key (PU2) and a corresponding private key (PR2), the method comprising:

obtaining a digital license corresponding to the content, the digital license including the content key (KD) encrypted according to the public key (PU2) of the second device (PU2 (KD)); and decrypting (PU2(KD)) from the digital license according to the private key (PR2) of the second device to produce the content key (KD).

7. The method of claim 5 wherein the second device is a computer.

8. The method of claim 1 wherein, the first device is a portable device.

9. The method of claim 1 wherein obtaining from the first device the public key thereof (PU1) comprises receiving a certificate from the first device within which is (PU1).

10. The method of claim 9 further comprising comparing the received certificate against a revocation list to ensure that the certificate has not been compromised.

11. The method of claim 9 comprising receiving a certificate from the first device within which is (PU1) and information relating to the first device.

12. The method of claim 11 further comprising, prior to composing the sub-license and transferring the composed sub-license to the device, checking the obtained license to determine that such license permits issuance of the sub-license to the device, such checking including employing the information relating to the first device to determine whether the license permits issuance of the sub-license.

13. The method of claim 11 comprising receiving a certificate from the first device within which is (PU1) and information relating to at least one of the name, type, and manufacturer of the first device.

14. The method of claim 1 further comprising obtaining (PU1 (KD)) from the transferred sub-license, applying (PR1) to (PU1 (KD)) to obtain the content key (KD)), and applying (KD) to decrypt the encrypted content, all by the first device.

15. A method for a user at first and second devices to render encrypted digital content on a first device computing having a public key (PU1) and a corresponding private key (PR1) by way of a second device distinct from the first device, the second device having a public key (PU1) and a corresponding private key (PR2), the digital content being encrypted according to a content key (KD), the method comprising:

the user at the second device obtaining from a licensor distinct from the second device a digital license corresponding to the content and the second device, the digital license including the content key (KD) therein encrypted according to the public key (PU2) of the second device (PU2 (KD)), and also including rules for determining whether the license permits issuance of a sub-license from the second device to the first device;

the user at the second device determining that the rules of the license do in fact permit issuance of a sub-license from the second device to the first device;

the user at the second device decrypting (PU2) (KD)) from the digital license with the corresponding private key (PR2) to produce the content key (KD);

the user at the second device obtaining from the first device the public key thereof (PU1);

the user at the second device encrypting the content key (KD) according to the public key (PU1) of the first device (PU1 (KD)); and the user at the second device composing the sub-license corresponding to and based on the obtained license for the first device, the sub-license including (PU1 (KD)), and transferring the composed sub-license to the first device;

the user at the first device receiving the composed sub-license from the second device;

the user at the first device obtaining (PU1 (KD)) from the received sub-license;

the user at the first device applying (PR1) to (PU1 (KD)) to obtain the content key (KD);

the user at the first device applying (KD) to decrypt the encrypted content; and the user at the first device rendering the decrypted content.

16. The method of claim 15 further comprising receiving the content from the second device.

17. The method of claim 15 for rendering encrypted digital content on a first device having a digital rights management (DRM) system, the DRM system having the public key (PU1) and the corresponding private key (PR1), the digital content being encrypted according to a content key (KD), the method comprising:

providing the public key (PU1) of the DRM system to the second device;

receiving the composed sub-license from the second device;

obtaining (PU1 (KD)) from the received sub-license;

applying the private key (PR1) of the DRM system to (PU1 (KD)) to obtain the content key (KD);

applying (KD) to decrypt the encrypted content; and rendering the decrypted content.

18. The method of claim 15 wherein the second device is a computer.

19. The method of claim 15 wherein, the first device is a portable device.

20. The method of claim 15 wherein providing the public key (PU1) to the second device comprises providing a certificate to the second device within which is (PU1).

21. The method of claim 20 wherein providing the public key (PU1) to the second device comprises providing a certificate to the second device within which is (PU1) and information relating to the first device, wherein the second device can employ the information relating to the first device to determine whether the obtained license permits issuance of the sub-license.

22. The method of claim 21 comprising providing the certificate to the second device within which is (PU1) and information relating to at least one of the name, type, and manufacturer of the first device.

* * * * *